(12) United States Patent
Sakai et al.

(10) Patent No.: US 11,216,934 B2
(45) Date of Patent: Jan. 4, 2022

(54) DETERMINATION DEVICE, DETERMINATION SYSTEM, WELDING SYSTEM, DETERMINATION METHOD, AND STORAGE MEDIUM

(71) Applicant: KABUSHIKI KAISHA TOSHIBA, Minato-ku (JP)

(72) Inventors: Tetsuo Sakai, Taito (JP); Taisuke Washitani, Yokohama (JP); Yasutomo Shiomi, Koza (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/854,981

(22) Filed: Apr. 22, 2020

(65) Prior Publication Data

US 2020/0357112 A1 Nov. 12, 2020

(30) Foreign Application Priority Data

May 8, 2019 (JP) .............................. JP2019-088664

(51) Int. Cl.
*G06T 7/00* (2017.01)
*G06T 7/73* (2017.01)
(52) U.S. Cl.
CPC .............. *G06T 7/0004* (2013.01); *G06T 7/75* (2017.01); *G06T 2207/30108* (2013.01)

(58) Field of Classification Search
CPC ........ G06T 7/75; G06T 7/0004; B23Q 35/127
See application file for complete search history.

(56) References Cited

U.S. PATENT DOCUMENTS 4,168,430 A * 9/1979 Denis .................... B23K 11/252
219/110
4,877,940 A * 10/1989 Bangs .................. B23Q 35/127
219/124.34

FOREIGN PATENT DOCUMENTS

| JP | 2018-39028 A | 3/2018 | |
| JP | 2018-192524 A | 12/2018 | |
| KR | 100687811 | * 3/2007 | ............... G06T 7/00 |

* cited by examiner

*Primary Examiner* — Myron Wyche
(74) *Attorney, Agent, or Firm* — Oblon, McClelland, Maier & Neustadt, L.L.P.

(57) ABSTRACT

According to one embodiment, a determination device includes a processor. The processor inputs a first image to a first model when the first image is input to the processor. The first image is of a welding spot when welding. The first model is for determining whether or not an image is appropriate. The processor determines an appropriateness of a weld by using the first image when the first image is determined to be appropriate by the first model, and outputs information for correcting an imaging condition of the welding spot when the first image is determined to be inappropriate by the first model.

10 Claims, 24 Drawing Sheets

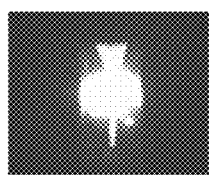 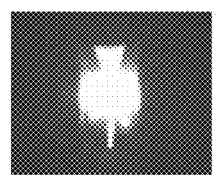 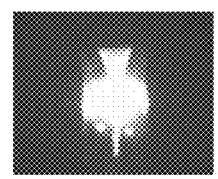
FIG. 5A  FIG. 5B  FIG. 5C
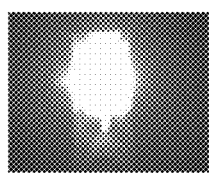 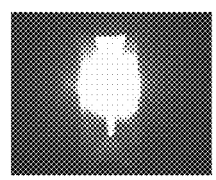 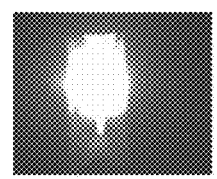
FIG. 5D  FIG. 5E  FIG. 5F
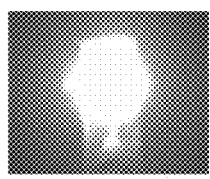 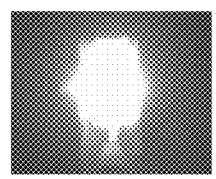 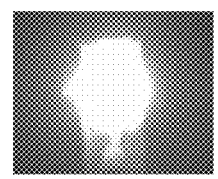
FIG. 5G  FIG. 5H  FIG. 5I
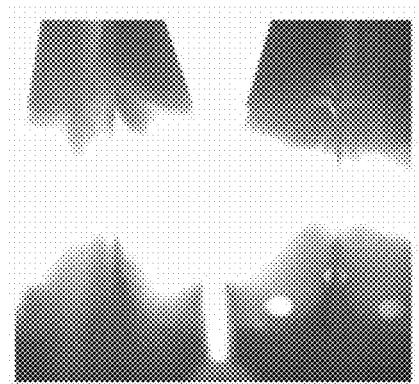
FIG. 6A
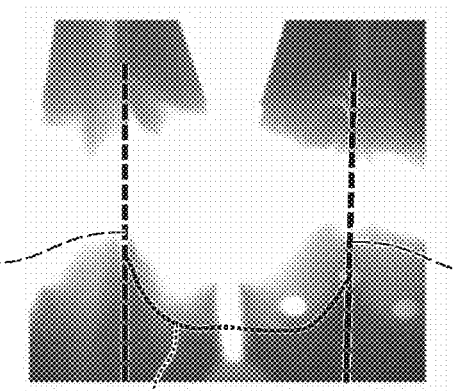
FIG. 6B

L4  L1      L3      L2

L1      L3      L2

DETERMINATION DEVICE, DETERMINATION SYSTEM, WELDING SYSTEM, DETERMINATION METHOD, AND STORAGE MEDIUM

CROSS-REFERENCE TO RELATED APPLICATIONS

This application is based upon and claims the benefit of priority from Japanese Patent Application No. 2019-088664, filed on May 8, 2019; the entire contents of which are incorporated herein by reference.

FIELD

Embodiments described herein relate generally to a determination device, a determination system, a welding system, a determination method, and a storage medium.

BACKGROUND

There is a determination device determining the quality of a weld. High accuracy of the determination is desirable.

BRIEF DESCRIPTION OF THE DRAWINGS

FIG. 5A to FIG. 5I, FIG. 6A, and FIG. 6B are examples of images obtained in the first example;

DETAILED DESCRIPTION

Figure 1:
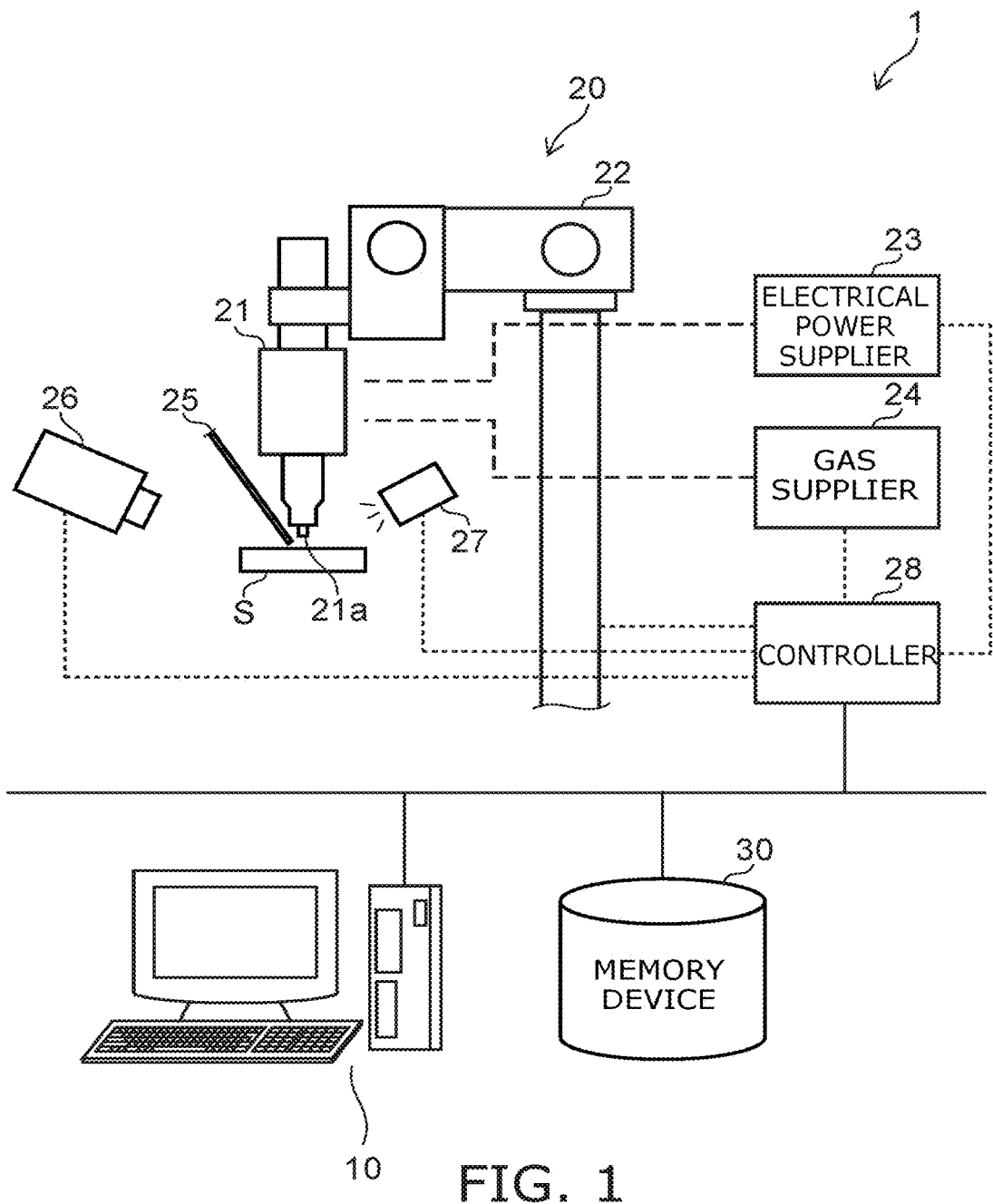
FIG. 1 is a schematic view illustrating the configuration of a welding system including a determination device according to an embodiment.

According to one embodiment, a determination device includes a processor. The processor inputs a first image to a first model when the first image is input to the processor. The first image is of a welding spot when welding. The first model is for determining whether or not an image is appropriate. The processor determines an appropriateness of a weld by using the first image when the first image is determined to be appropriate by the first model, and outputs information for correcting an imaging condition of the welding spot when the first image is determined to be inappropriate by the first model.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

FIG. 1 is a schematic view illustrating the configuration of a welding system including a determination device according to an embodiment.

The welding system 1 includes a determination device 10, a welding device 20, and a memory device 30.

The welding device 20 joins two or more members by welding. For example, the welding device 20 performs arc welding or laser welding. Specifically, the arc welding is tungsten inert gas (TIG) welding, metal inert gas (MIG) welding, metal active gas (MAG) welding, carbon dioxide gas arc welding, etc. Here, examples in which the welding device 20 performs TIG welding mainly are described.

The welding device 20 includes, for example, a head 21, an arm 22, an electrical power supplier 23, a gas supplier 24, a wire 25, an imager 26, an illuminator 27, and a controller 28.

An electrode 21a that is made of tungsten is provided in the head 21. The tip of the electrode 21a is exposed at the head 21. For example, the head 21 is mounted to the articulated arm 22 including multiple links. Or, the head 21 may be provided in a welding torch gripped by an operator.

The electrical power supplier 23 is electrically connected to the electrode 21a and a welding object S. A voltage is applied between the electrode 21a and the welding object S by the electrical power supplier 23, and an arc discharge occurs. One of the electrode 21a or the welding object S may be set to a common potential (e.g., a ground potential), and the electrical power supplier 23 may control only the potential of the other of the electrode 21a or the welding object S.

The gas supplier 24 is connected to the head 21. The gas supplier 24 supplies an inert gas to the head 21. Or, the gas supplier 24 may supply a gas mixture of an inert gas and an active gas. The gas that is supplied to the head 21 is blown toward the welding object S from the tip of the head 21 where the electrode 21a is exposed.

The tip of the wire 25 is located in the space where the arc discharge is generated. The tip of the wire 25 is melted by the arc discharge and drops onto the welding object S. The welding object S is welded by the melted wire 25 solidifying. For example, the wire 25 is fixed to the arm 22 and is supplied automatically as the melting progresses.

The imager 26 images the spot where the welding is performed when welding. The imager 26 acquires a still image by imaging the welding spot. Or, the imager 26 may image a video image. The imager 26 may acquire a still image by extracting a portion of a video image. The imager 26 is, for example, a camera including a CCD image sensor or a CMOS image sensor.

The illuminator 27 illuminates the welding spot when welding so that the imager 26 obtains a clearer image. The illuminator 27 may not be provided if an image that is useable in the determination described below is obtained without illuminating the welding spot.

The controller 28 controls the operations of the components of the welding device 20 described above. For example, the controller 28 welds the welding object S along a prescribed direction by generating the arc discharge while driving the arm 22. Also, the controller 28 may control settings of the imager 26, settings of the illuminator 27, etc.

The controller 28 stores the image acquired by the imager 26 in the memory device 30. For example, the controller 28 stores the imaged image in the memory device 30 by associating the imaged image with the welding conditions when imaging and the imaging conditions when imaging.

The welding conditions include, for example, the applied voltage, the gas flow rate, the current value, the wire supply rate, or the welding speed. The imaging conditions include, for example, the settings of the imager 26 such as the exposure time, the aperture stop, the sensitivity (ISO), etc. The imaging conditions may include the settings of the illuminator 27. For example, when supplying a pulse current to the illuminator 27, the imaging conditions further include the pulse width, the pulse frequency, the duty ratio, or the peak value. Here, when multiple items are listed as examples connected by "or", this means that all of the items may be included, or only some of the items may be included.

Figure 2:
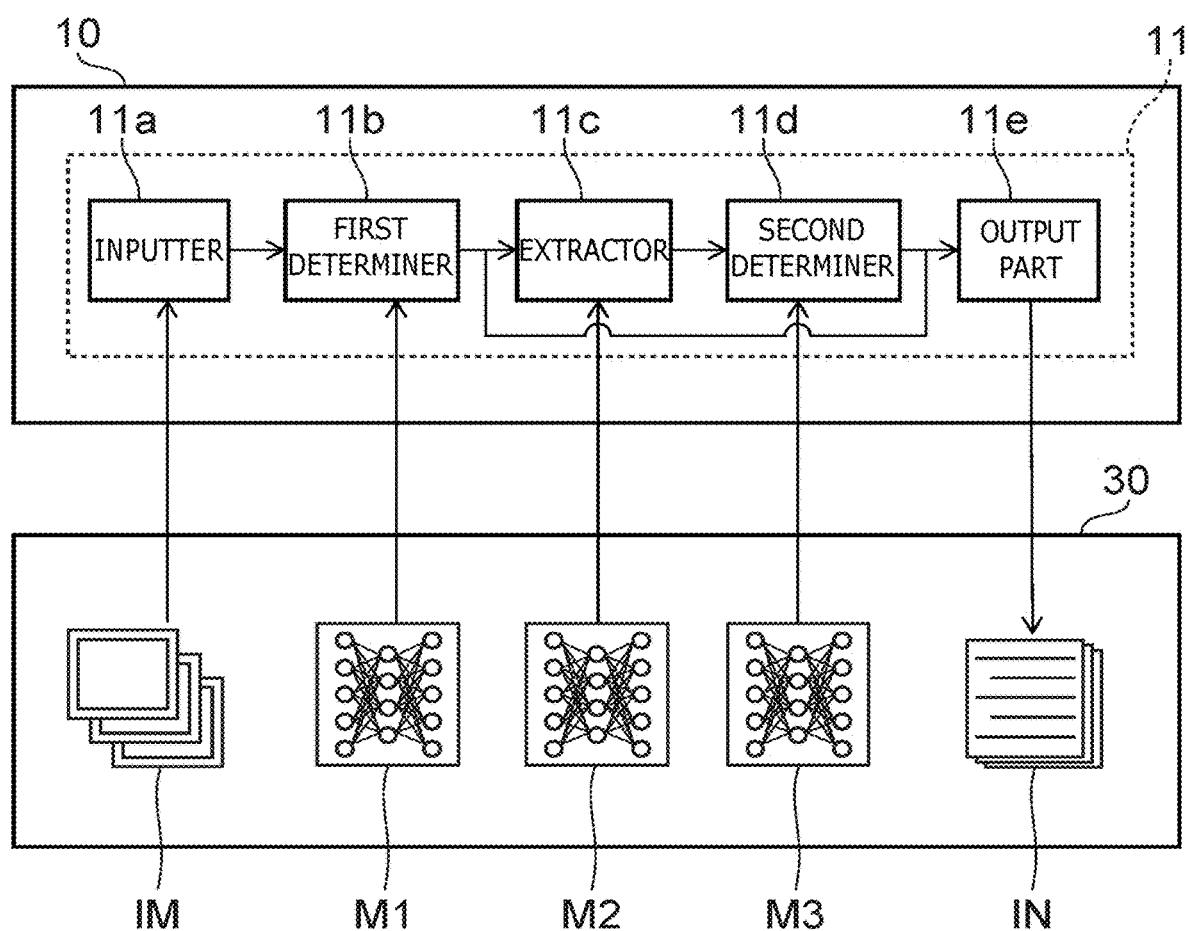
FIG. 2 is a schematic view illustrating the functional configuration of the determination device according to the embodiment.

FIG. 2 is a schematic view illustrating the functional configuration of the determination device according to the embodiment.

The determination device 10 includes a processor 11. The processor 11 includes, for example, an inputter 11a, a first determiner 11b, an extractor 11c, a second determiner 11d, and an output part 11e.

The determination device 10 has a wired connection or a wireless connection with the welding device 20 and the memory device 30. The determination device 10 may be connected to the welding device 20 and the memory device 30 via a network. The determination device 10, the welding device 20, and the memory device 30 may be included in one device.

The inputter 11a accesses the memory device 30 and acquires an image IM stored in the memory device 30. Or, an image may be transmitted directly from the controller 28 to the processor 11. The inputter 11a accepts the data transmitted from the controller 28.

When the image when welding is input to the inputter 11a, the first determiner 11b refers to a trained first model M1. The first model M1 is used to determine whether or not the image that is imaged when welding is appropriate. The first determiner 11b inputs the image to the trained first model M1 and determines whether or not the image is appropriate. When the image is determined to be inappropriate by the first model M1, the first model M1 also outputs information for correcting the imaging condition.

For example, the first model M1 is a neural network. The first model M1 is pretrained using teaching data. The teaching data includes multiple labels and multiple images imaged when welding. The multiple labels respectively indicate whether or not the multiple images are appropriate. Also, for the inappropriate images, the multiple labels indicate how the image is inappropriate.

For example, the first model M1 is used to determine whether or not the image is too dark or too bright. When the image is determined to be too the dark or too bright by the first model M1, the first determiner 11b outputs information indicating the determination. The first model M1 may output a specific correction amount of an imaging condition for imaging a more appropriate image.

As an example, the image is determined to be too bright by the first model M1, and information that indicates the determination is output. The output part 11e transmits the information to the controller 28. When receiving the information, the controller 28 modifies an imaging condition to make the image darker. For example, the controller 28 performs a reduction of the exposure time, an increase of the aperture stop, a reduction of the sensitivity, a reduction of the pulse width, a reduction of the pulse frequency, a reduction of the duty ratio, or a reduction of the peak value. The controller 28 again images the welding spot when welding at the modified imaging condition.

When the image is determined to be appropriate by the first model M1, the extractor 11c refers to a trained second model M2. The second model M2 is used to extract a feature relating to a weld from an image. For example, the second model M2 is a neural network. The second model M2 is pretrained using teaching data. The teaching data includes multiple appropriate images and multiple images respectively showing features based on the images.

The extractor 11c inputs the image to the trained second model M2 and extracts a feature relating to the weld. When the feature is extracted, the second determiner 11d refers to a trained third model M3. The third model M3 is used to determine whether or not a weld is appropriate. The third model M3 is stored in the memory device 30 or another memory device. The second determiner 11d inputs the image showing the feature to the third model M3 and determines whether or not the weld shown in the image is appropriate.

For example, the third model M3 is a neural network. The third model M3 is pretrained using teaching data. The teaching data includes multiple images showing features relating to welds, and multiple labels respectively indicating the appropriateness of the welds shown in the images.

When the weld is determined to be inappropriate, the third model M3 also may output a correction amount of a welding condition. In such a case, the labels of the teaching data indicate the appropriateness of the weld and indicate the correction amount of the inappropriate weld. The correction amount of the welding condition can be output from the third model M3 by performing training using labels indicating the correction amounts.

Or, the third model M3 may be trained to output only the correction amount without the appropriateness of the weld. In such a case, it can be considered that the weld is determined to be appropriate by the third model M3 when the correction amount output by the third model M3 is zero or very small.

The output part 11e externally outputs the determination result of the second determiner 11d. For example, when the correction amount is output by the third model M3, the output part 11e transmits the correction amount to the controller 28. The controller 28 modifies the welding condition according to the correction amount.

As an example, when the position of the weld is shifted from the standard position, the weld is determined to be inappropriate by the third model M3. The position of the weld corresponds to the position of the electrode 21a. In such a case, the third model M3 outputs a correction amount of the position of the electrode 21a for a more appropriate weld.

The output part 11e may associate the determination result and the welding condition when the image used in the determination was obtained. The output part 11e stores information IN that is associated in the memory device 30. For example, the welding device 20 refers to the information IN of the memory device 30 when welding. Based on the information IN, the welding device 20 adjusts the welding condition so that more appropriate welding can be performed.

For example, multiple determination results and multiple welding conditions are stored in the memory device 30 by being associated respectively. A set of such associated information is called a process map. By accumulating the determination results and the welding conditions, the quality of the welds performed by the welding device 20 can be improved.

Effects of the embodiment will now be described.

In arc welding and laser welding, intense light is generated locally when welding. Therefore, an image that can be used to determine the appropriateness of the weld is not obtained unless the imaging condition is set appropriately. Also, the image that is obtained changes according to the conditions when welding such as the groove width, the shape of the groove, the welding position in the groove, the member configuration of the fillet welding, etc. Accordingly, fluctuation occurs easily in the image that is imaged. For example, if the image that is imaged is too bright, the state of the weld does not appear sufficiently in the image, and the appropriateness of the weld cannot be determined based on the image.

For this problem, in the embodiment, the processor 11 of the determination device 10 uses the first model to determine whether or not the image that is imaged by the imager 26 is appropriate. Thereby, the appropriateness of the weld can be determined using only the image determined to be appropriate by the first model. For example, an image that is too bright or too dark is not used to determine the appropriateness of the weld. As a result, the appropriateness of the weld can be determined with higher accuracy.

Also, when the image is determined to be inappropriate by the first model, the processor 11 outputs information for correcting an imaging condition. Based on the information, the imaging condition is corrected by the imager 26. An image that is useful for determining the appropriateness of the weld is obtained easily thereby.

When the image is determined to be appropriate by the first model, the processor 11 uses the second model to extract a feature relating to the weld from the image. The processor 11 determines the appropriateness of the weld using the extracted feature. Specifically, the processor 11 determines the appropriateness of the weld indicated by the feature by inputting the extracted feature to the third model. According to this method, the accuracy of the determination can be increased compared to the case where the appropriateness of the weld is determined based on the entire image.

The following method is an example of another determination method.

Pre-imaged comparison images of good states when welding are stored in the memory device 30. When the image is determined to be appropriate by the first model, the processor 11 compares the image and the comparison images. For example, the processor 11 determines that the weld is good when the likeness of the images is high. The likeness can be represented by a feature difference. The processor 11 determines the appropriateness of the weld by comparing the feature difference to a preset threshold.

It is possible to determine the appropriateness of the weld by this method as well. However, it is more desirable for the processor 11 to determine the appropriateness of the weld by using the second model and the third model. By using the second model to extract the feature relating to the weld from the image, the appropriateness of the weld can be determined with higher accuracy.

Figure 3:
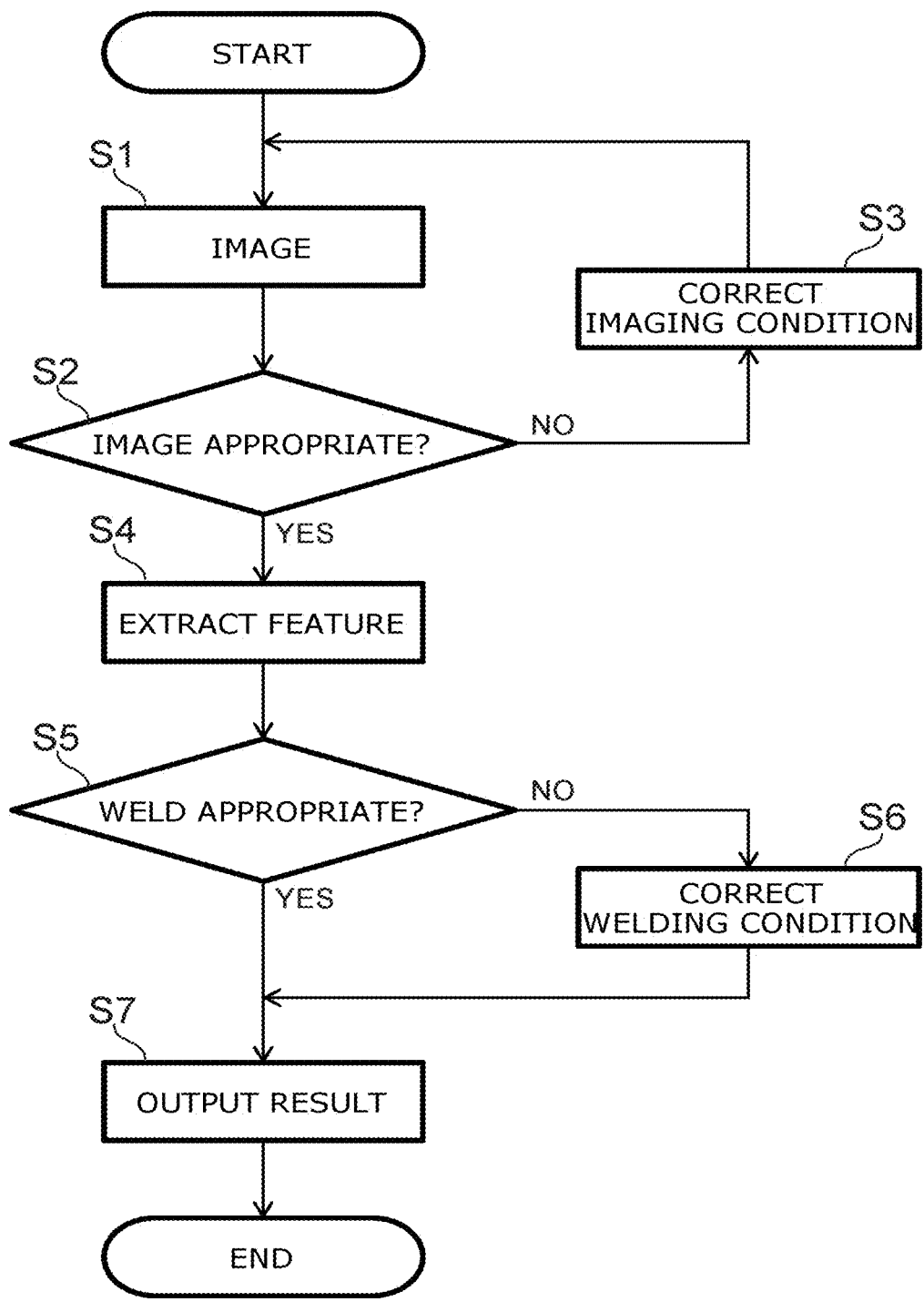
FIG. 3 is a flowchart illustrating the operation of the welding system according to the embodiment.

FIG. 3 is a flowchart illustrating the operation of the welding system according to the embodiment.

First, the imager 26 images the welding spot when welding and acquires an image (a first image) (step S1). The first determiner 11b of the processor 11 determines whether or not the image is appropriate by using the first model (step S2). When the image is inappropriate, information is transmitted from the output part 11e to the controller 28, and an imaging condition is corrected (step S3).

When the image is appropriate, the extractor 11c extracts a feature (a first feature) relating to the weld from the image by using the second model (step S4). The second determiner 11d determines the appropriateness of the weld indicated by the feature by using the third model (step S5). When the weld is inappropriate, information is transmitted from the output part 11e to the controller 28, and a welding condition is corrected (step S6).

The output part 11e outputs information when the weld is determined to be appropriate or after correcting the welding condition (step S7). For example, the output part 11e stores, in the memory device 30, the determination result associated with the image that is imaged, the welding conditions when imaging, and the imaging conditions when imaging.

First Example

Figure 4:
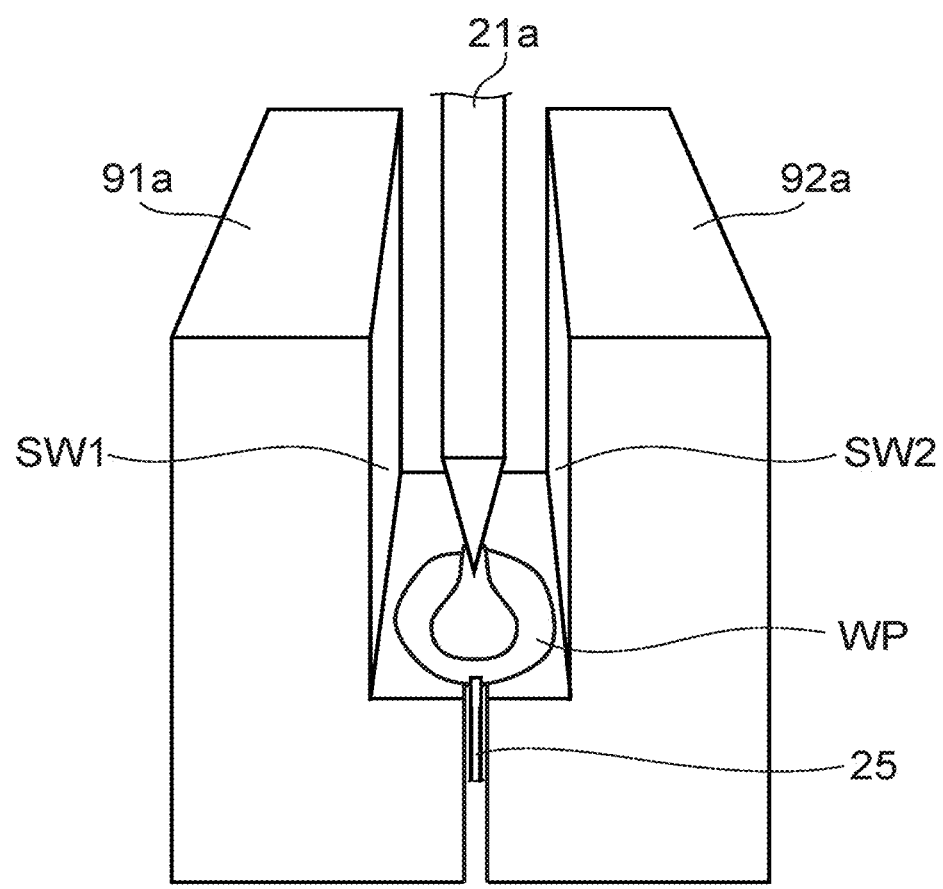
FIG. 4 is a schematic view illustrating a welding process of a first example.

FIG. 4 is a schematic view illustrating a welding process of a first example.

FIG. 5A to FIG. 5I, FIG. 6A, and FIG. 6B are examples of images obtained in the first example.

TIG welding of a first member 91a and a second member 92a illustrated in FIG. 4 is performed in the first example. The first member 91a has a first wall surface SW1 provided in the groove. The second member 92a has a second wall surface SW2 provided in the groove.

The tip of the electrode 21a and the tip of the wire 25 are located between the first wall surface SW1 and the second wall surface SW2, and arc discharge is generated. The wire 25 is melted, and a weld pool WP is formed. The first member 91a and the second member 92a are welded by the weld pool WP solidifying.

The imager 26 images the state when welding illustrated in FIG. 4 from an angle at which the weld pool WP, the tip of the electrode 21a, and the tip of the wire 25 can be viewed. When the image is acquired by the imager 26, the first determiner 11b of the processor 11 determines whether or not the image is appropriate by using the first model.

FIG. 5A to FIG. 5C are examples of images determined to be too dark. FIG. 5D to FIG. 5F are examples of images determined to be appropriate. FIG. 5G to FIG. 5I are examples of images determined to be too bright.

When the images illustrated in FIG. 5A to FIG. 5C are input to the first model, the first model outputs determination results indicating that the images are inappropriate and outputs a correction amount of an imaging condition for making the images brighter. When the images illustrated in FIG. 5G to FIG. 5I are input to the first model, the first model outputs determination results indicating that the images are inappropriate and outputs a correction amount of the imaging condition for making the images darker.

FIG. 6A shows an image determined to be appropriate by the first model. The extractor 11c inputs the image illustrated in FIG. 6A to the second model. As a result, line segments shown by broken lines BL and a dotted line DL inside the image of FIG. 6B are extracted as features. In the example of FIG. 6B, the extracted line segments are displayed overlaid on the image of FIG. 6A. The display is not limited to the example; the second model M2 may output an image that does not include the original image and includes only the extracted line segments.

In the image illustrated in FIG. 6B, the broken lines BL correspond respectively to the first wall surface SW1 and the second wall surface SW2. The dotted line DL corresponds to the end portion of the weld pool WP. The second determiner 11d inputs the image illustrated in FIG. 6B to the third model and determines the appropriateness of the weld.

In the image illustrated in FIG. 6B, the two ends of the dotted line DL respectively contact the broken lines BL. This means that the weld is performed at the center between the first wall surface SW1 and the second wall surface SW2. For example, the weld that is shown in the image of FIG. 6B is determined to be appropriate.

On the other hand, the weld is determined to be inappropriate if an end portion of the dotted line DL is separated from the broken line BL or the center of the dotted line DL is shifted from the center between the broken lines BL in a direction connecting the broken lines BL to each other. For example, the third model outputs a movement amount of the electrode 21a so that the welding is performed at the appropriate position.

Second Example

Figure 7:
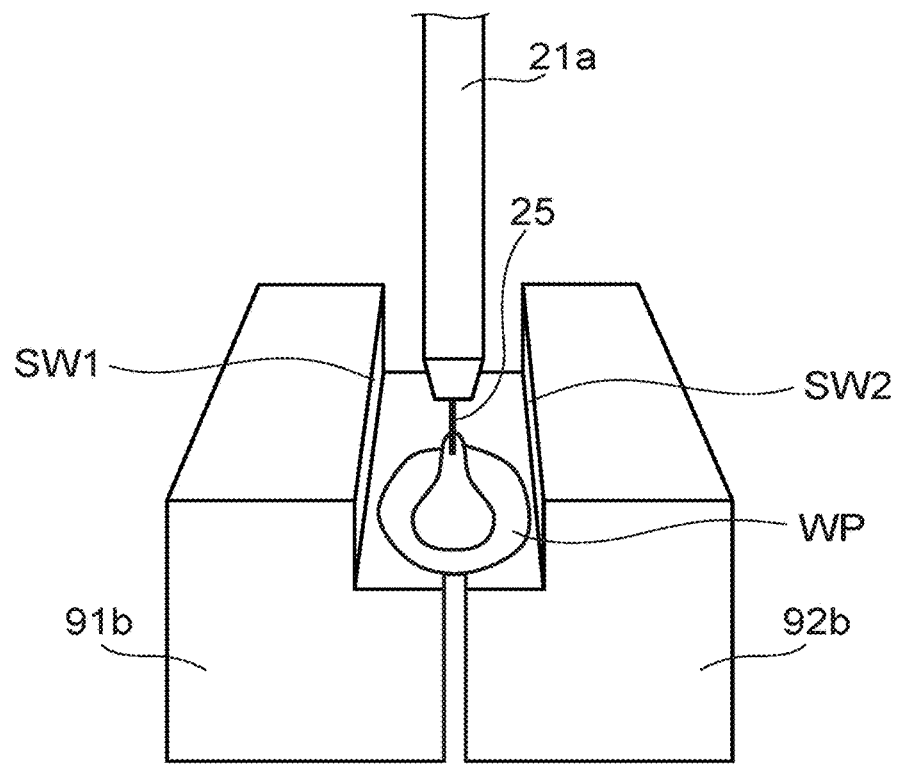
FIG. 7 is a schematic view illustrating a welding process of a second example.

FIG. 7 is a schematic view illustrating a welding process of a second example.

Figure 8A:
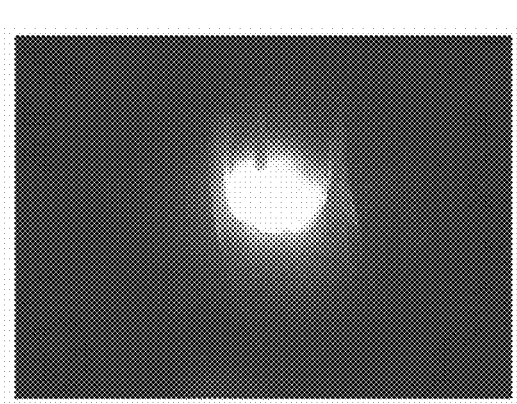
FIG. 8A and FIG. 8B are examples of images obtained in the second example.
Figure 8B:
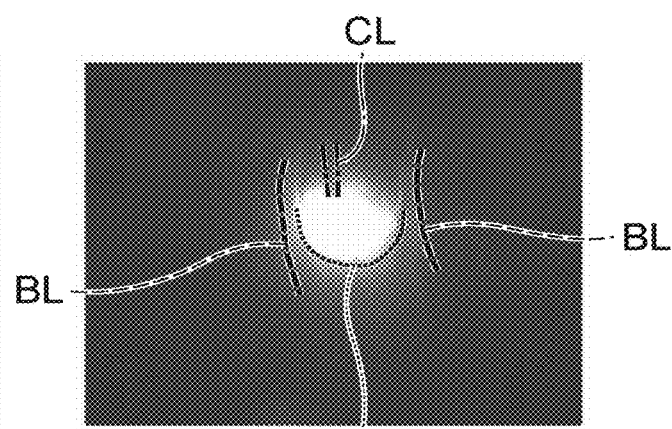

FIG. 8A and FIG. 8B are examples of images obtained in the second example.

MIG welding of a first member 91b and a second member 92b illustrated in FIG. 7 is performed in the second example. The first member 91b and the second member 92a respectively have the first wall surface SW1 and the second wall surface SW2 provided in the groove.

The tip of the wire 25 is drawn out from the electrode 21a and located between the first wall surface SW1 and the second wall surface SW2. The wire 25 is melted by generating arc discharge between the wire 25 and the welding object. Thereby, the weld pool WP is formed, and the first member 91b and the second member 92b are welded.

The imager 26 images the state when welding illustrated in FIG. 7 from an angle at which the weld pool WP and the tip of the wire 25 can be viewed. FIG. 8A shows an image determined to be appropriate by the first model. The extractor 11c inputs the image illustrated in FIG. 8A to the second model. As a result, line segments shown by the broken lines BL, the dotted line DL, and broken chain lines CL inside the image of FIG. 8B are extracted as features.

In the image illustrated in FIG. 8B, the broken lines BL correspond respectively to the first wall surface SW1 and the second wall surface SW2. The dotted line DL corresponds to the end portion of the weld pool WP. The broken chain lines CL correspond to the tip of the wire 25. The second determiner 11d inputs the image illustrated in FIG. 8B to the third model and determines the appropriateness of the weld.

In the image illustrated in FIG. 8B, the dotted line DL is positioned at the center between the broken lines BL in the direction connecting the broken lines BL to each other. For example, the weld shown in the image of FIG. 8B is determined to be appropriate.

Third Example

Figure 9:
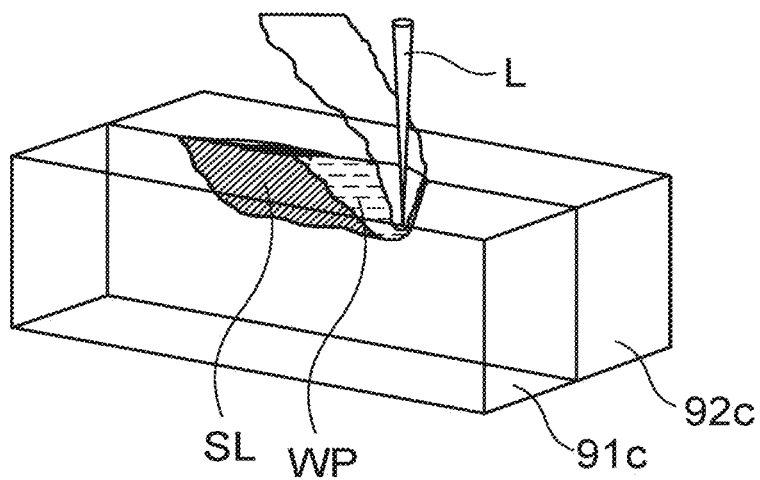
FIG. 9 is a schematic view illustrating a welding process of a third example.

FIG. 9 is a schematic view illustrating a welding process of a third example.

FIG. 10A to FIG. 10D, FIG. 11A, and FIG. 11B are examples of images obtained in the third example.

Laser welding of a first member 91c and a second member 92c illustrated in FIG. 9 is performed in the third example. The first member 91c and the second member 92c are provided to be in contact with each other, and a laser L is irradiated on the contact portion.

When the laser L is irradiated, the first member 91c and the second member 92c are melted, and the weld pool WP is formed. A solidified layer SL is formed when the weld pool WP is cooled. The first member 91c and the second member 92c are welded by irradiating the laser L progressively onto the contact portion of the first member 91c and the second member 92c.

The imager 26 images the state when welding illustrated in FIG. 9 from an angle at which the weld pool WP and the irradiation point of the laser L can be viewed. For example, the imager 26 acquires the image illustrated in FIG. 10A. The first determiner 11b inputs the image illustrated in FIG. 10A to the first model and determines whether or not the image is appropriate.

Figure 10A:
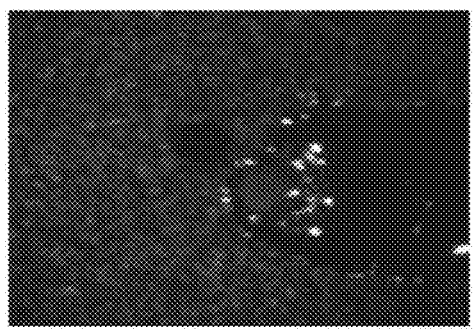
FIG. 10A to FIG. 10D, FIG. 11A, and FIG. 11B are examples of images obtained in the third example.
Figure 10B:
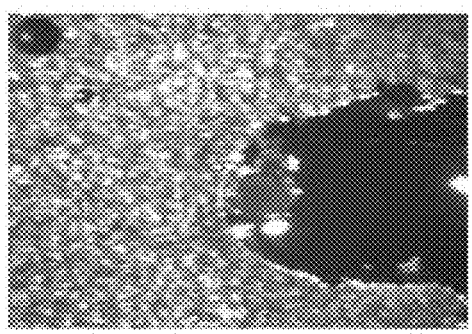

For example, the image illustrated in FIG. 10A is too dark and is determined to be inappropriate. The output part 11e transmits a correction amount of an imaging condition to the controller 28 to make the image brighter.

The imager 26 uses the modified imaging condition to reimage the state when welding. For example, the imager 26 acquires the image illustrated in FIG. 10B. The first determiner 11b inputs the image illustrated in FIG. 10B to the first model M1 and redetermines whether or not the image is appropriate.

Figure 10C:
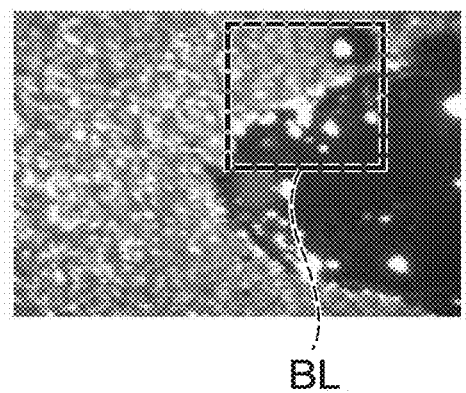
Figure 10D:
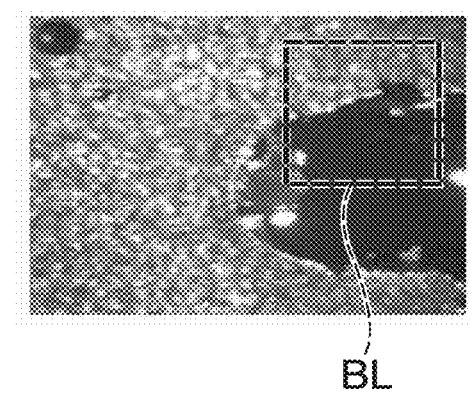

The first model M1 may be trained to determine whether or not the image is appropriate based on a portion of the image. FIG. 10C and FIG. 10D are examples of images acquired by the imager 26. In FIG. 10C and FIG. 10D, the dark portions on the right side are weld pools (liquid). The other bright portions are members and solidified layers (solid).

For example, the contrast of the image affects the determination by the first model. The image is determined to be too bright or too dark according to the difference between the maximum luminance and the minimum luminance of the image. It is desirable for the weld pool to be imaged clearly in the image. Accordingly, it is desirable to determine whether or not the image is appropriate from the minimum luminance based on the weld pool portion and the maximum luminance based on another solid portion.

For example, as illustrated by the broken line BL of FIG. 10C, it is desirable to determine whether or not the image is appropriate based on only one portion of the image including both a portion of the weld pool and a portion of the solid portion. The decrease of the accuracy of the determination of the image due to unintended dark spots or white spots included in the image can be suppressed thereby.

As illustrated in FIG. 10C and FIG. 10D, the size and the position of the weld pool may change between the images. Therefore, it is desirable to train the first model M1 so that the portion used in the determination can be extracted for each image. For example, the position and the size of the broken line BL in the image illustrated in FIG. 10D are different from the position and the size of the broken line BL in FIG. 10C.

Figure 11A:
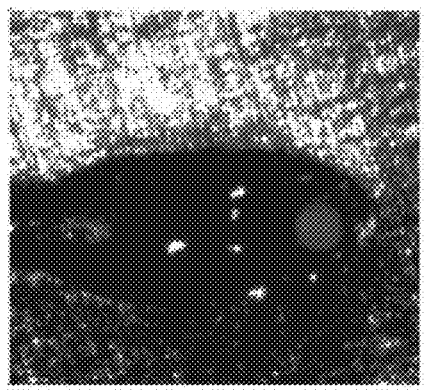

FIG. 11A shows an image determined to be appropriate by the model M1 using the processing described above. The extractor 11c inputs the image illustrated in FIG. 11A to the second model. As a result, the line segments shown by the broken lines BL, the dotted line DL, and the broken chain line CL inside the image of FIG. 11B are extracted as features.

Figure 11B:
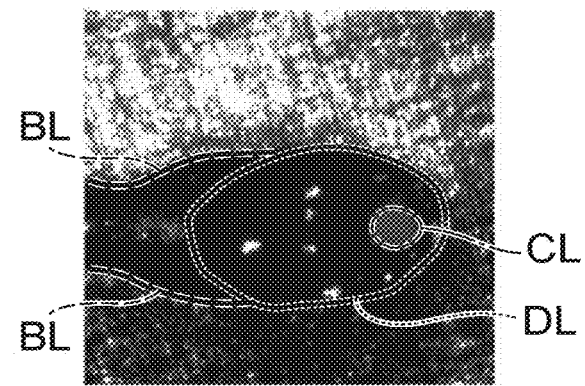

In the image illustrated in FIG. 11B, the broken lines BL correspond to the outer edges of the solidified layer SL. The dotted line DL corresponds to the outer edge of the weld pool WP. The broken chain line CL corresponds to the outer edge of the irradiation point of the laser L. The second determiner 11d inputs the image illustrated in FIG. 11B to the third model and determines the appropriateness of the weld.

The weld is determined to be appropriate in the image illustrated in FIG. 11B because the shape of the broken chain line CL is nearly a perfect circle. Also, the appropriateness of the weld may be determined based on the change of the size or the shape of the broken chain line CL over time, the change of the length in a prescribed direction of the dotted line DL over time, the change of the distance between the broken lines BL over time, the change of the distance between the broken lines BL in one image, etc.

When the appropriateness of the weld is determined based on the change over time, the third model M3 also is trained accordingly. In such a case, for example, the third model M3 is a recurrent neural network (RNN). It is desirable for the third model M3 to have a Long Short-Term Memory (LSTM) structure. For example, the third model M3 is trained using time-series data and labels indicating the appropriateness of the time-series data.

First Modification

Figure 12:
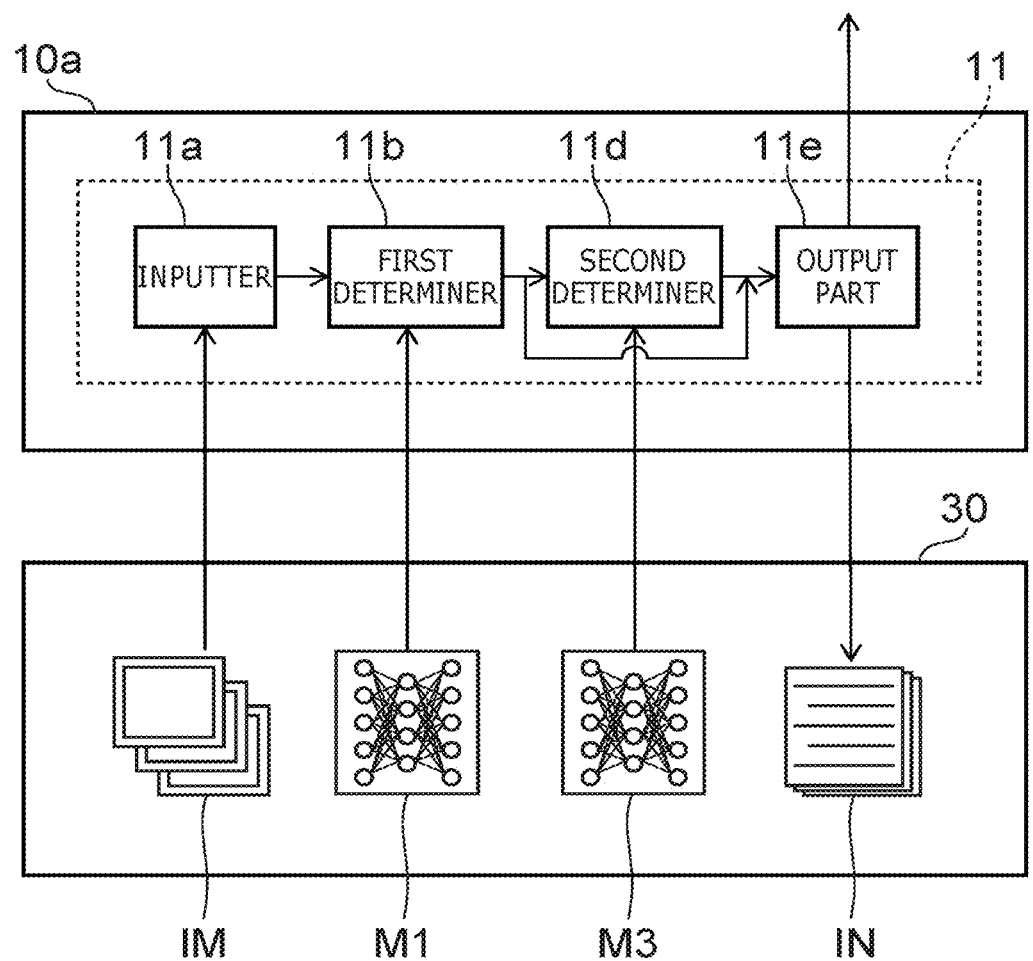
FIG. 12 is a schematic view illustrating the functional configuration of a determination device according to a first modification of the embodiment.

FIG. 12 is a schematic view illustrating the functional configuration of a determination device according to a first modification of the embodiment.

In the determination device 10a according to the first modification, the processor 11 does not include the extractor 11c. When the image is determined to be appropriate by the first model M1, the second determiner 11d directly determines the appropriateness of the weld from the image by using the third model M3 stored in the memory device 30. When the weld is determined to be inappropriate, a correction amount of a welding condition also is output from the third model M3.

Thus, in the determination device 10a according to the first modification, the appropriateness of the weld is determined directly by the third model M3 from the image determined to be appropriate by the first model M1 without extracting a feature. Therefore, the calculation amount can be reduced compared to the determination device 10 illustrated in FIG. 2. On the other hand, in the determination device 10 illustrated in FIG. 2, the extraction of the feature from the image and the determination for the weld are performed using different models. Therefore, if an abnormality occurs in the output from the processor 11, the models can be inspected, adjusted, or replaced individually. In other words, the maintenance is easy for the models that are used.

Second Modification

Figure 13:
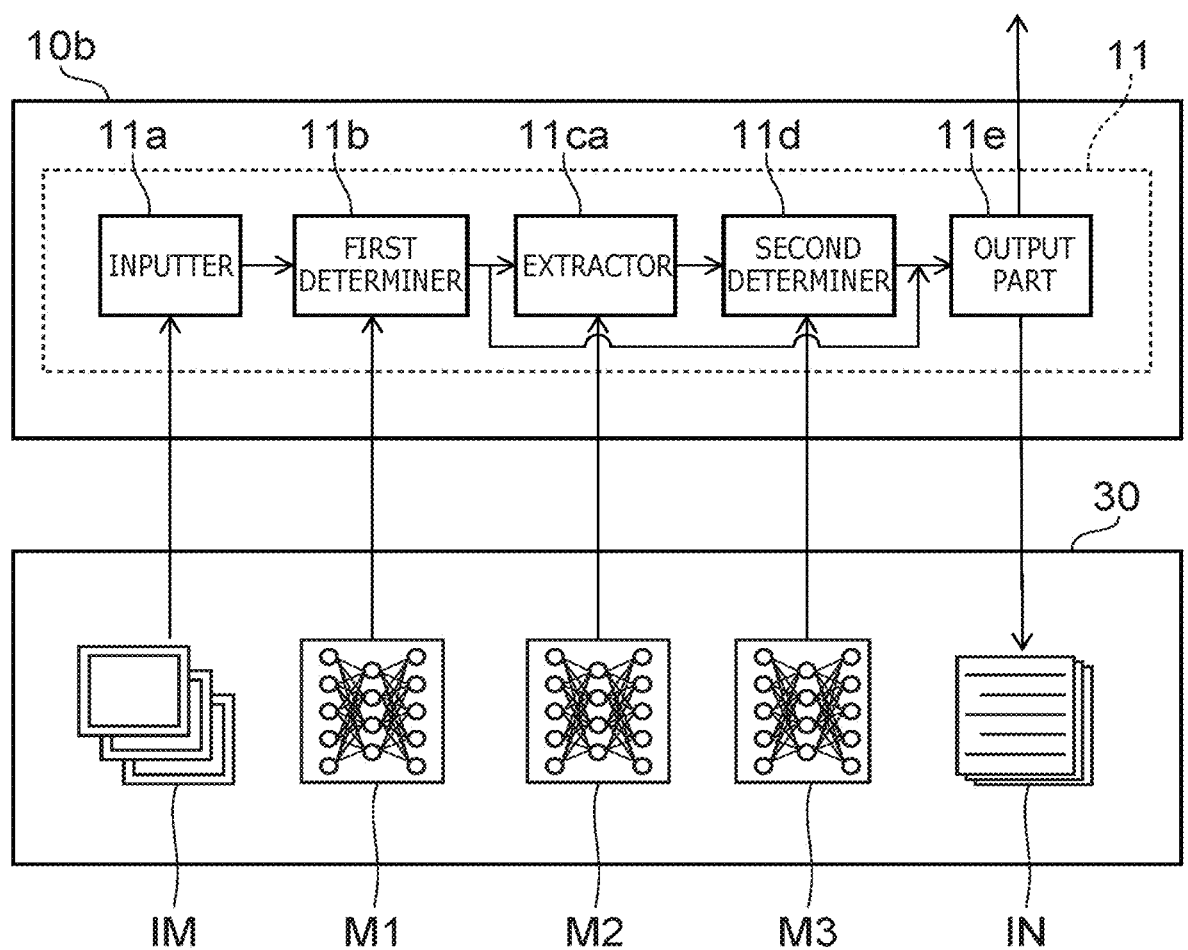
FIG. 13 is a schematic view illustrating the functional configuration of a determination device according to a second modification of the embodiment.

FIG. 13 is a schematic view illustrating the functional configuration of a determination device according to a second modification of the embodiment.

In the determination device 10b according to the second modification, when an extractor 11ca extracts a feature by using the second model M2, the feature is extracted directly, or a feature of a corrected image is extracted. For example, if the image input to the second model M2 is rotated, enlarged, or reduced with respect to a reference state, the second model M2 outputs a feature for an image generated by rotating, enlarging, or reducing the input image.

Also, the second model M2 may output a feature for an image generated by adjusting the contrast of the input image. If a defect, a scratch, or a bead mark of the foundation is included in the input image, the second model M2 extracts a feature for an image generated by removing the defect, the scratch, or the bead mark. Or, the second model M2 may output a feature for an image generated by enlarging or reducing the bead width of the input image. In other words, the correction of the image may include a rotation, an enlargement, a reduction, a contrast adjustment, a removal of a defect, a removal of a scratch, a removal of a bead mark, or a modification of a bead width.

For example, if images that do not include defects, scratches, or bead marks are used when training the second model M2, there is a possibility that the second model M2 cannot appropriately extract the feature relating to the weld when the input image includes a defect, a scratch, or a bead mark. Also, if an image that is input to the second model is rotated, enlarged, or reduced compared to the images used when training, there is a possibility that the feature relating to the weld cannot be extracted appropriately. Or, even if the feature relating to the weld can be extracted, there is a possibility that the appropriateness of the weld cannot be determined accurately based on the feature extracted subsequently by the third model M3.

As described above, because the second model M2 is configured to output a feature for an image generated by correcting the input image, the appropriateness of the weld can be determined with higher accuracy based on the extracted feature.

FIG. 14A to FIG. 14D, FIG. 15A to FIG. 15D, FIG. 16A, and FIG. 16B are images illustrating processing by the determination device according to the second modification of the embodiment.

TIG welding states are shown in FIG. 14A to FIG. 14D, FIG. 15A to FIG. 15D, FIG. 16A, and FIG. 16B.

Figure 14A:
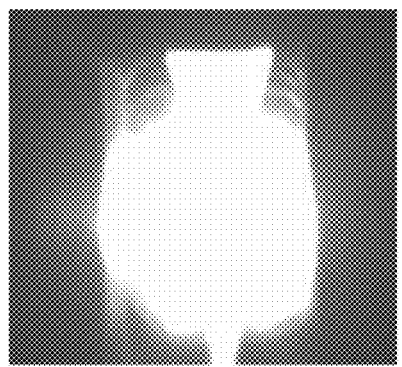
FIG. 14A to FIG. 14D, FIG. 15A to FIG. 15D, FIG. 16A, and FIG. 16B are images illustrating processing by the determination device according to the second modification of the embodiment.
Figure 14B:
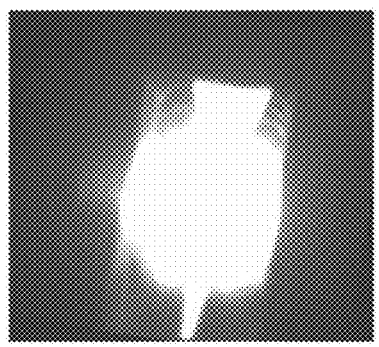
Figure 14D:
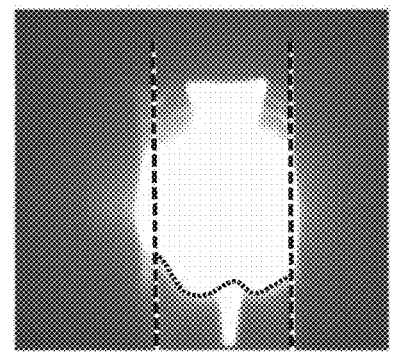
Figure 14C:
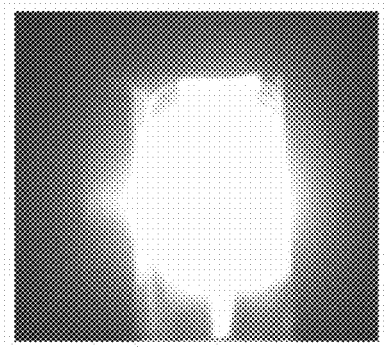

For example, the size of the weld pool in the image illustrated in FIG. 14A is greater than a standard. The image illustrated in FIG. 14B is rotated with respect to the standard image. The image illustrated in FIG. 14C is determined to be appropriate by the first model M1, but the contrast is higher than that of the standard image. The feature illustrated in FIG. 14D is output by inputting the images illustrated in FIG. 14A to FIG. 14C to the second model and by performing a rotation, a reduction, or a contrast adjustment of the features extracted directly from these images.

Figure 15A:
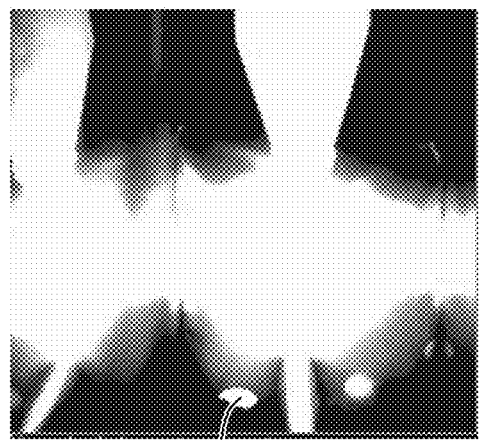
Figure 15B:
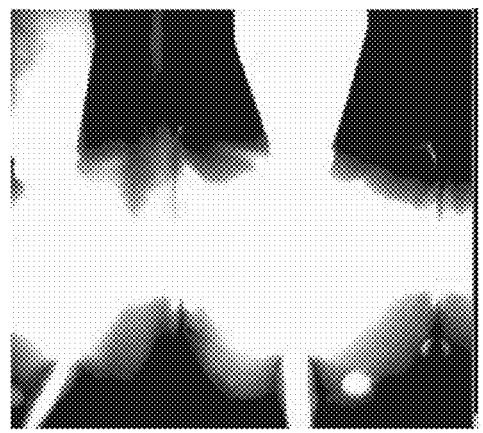
Figure 15C:
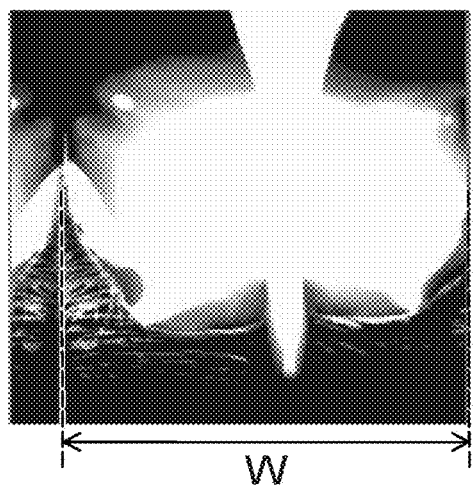
Figure 15D:
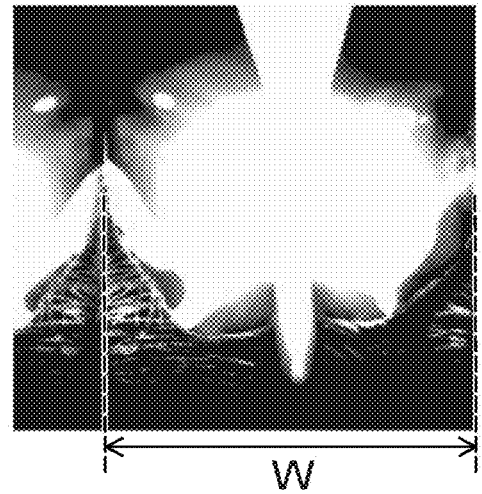

A defect DF is imaged in the image illustrated in FIG. 15A. The features are output by the second model based on the image illustrated in FIG. 15B from which the defect DF is removed. In the image illustrated in FIG. 15C, a bead width W is wider than a standard. The features are output by the second model based on the image illustrated in FIG. 15D in which the bead width W is reduced.

Figure 16A:
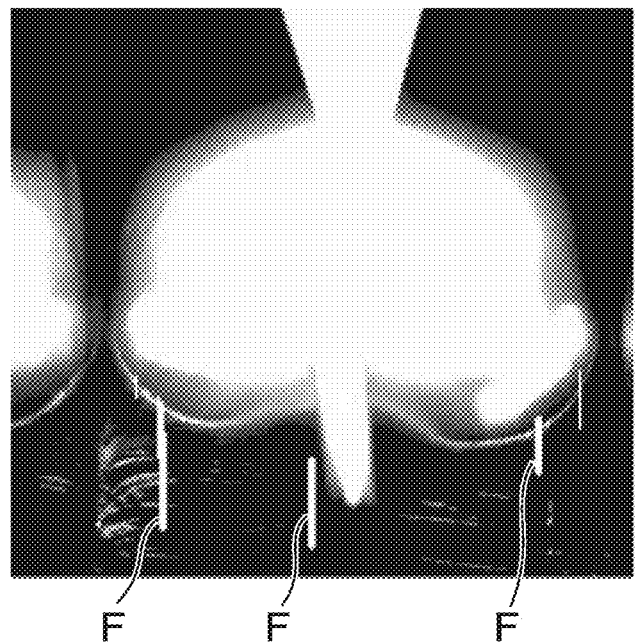
Figure 16B:
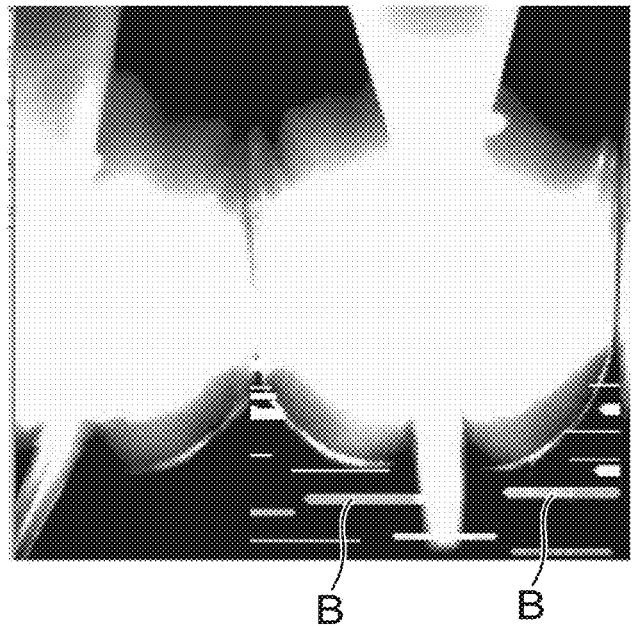

As another example, scratches F are imaged in the image illustrated in FIG. 16A. Bead marks B are imaged in the image illustrated in FIG. 16B. The features are output by the second model based on images from which the scratches F and the bead marks B are removed.

Third Modification

Figure 17:
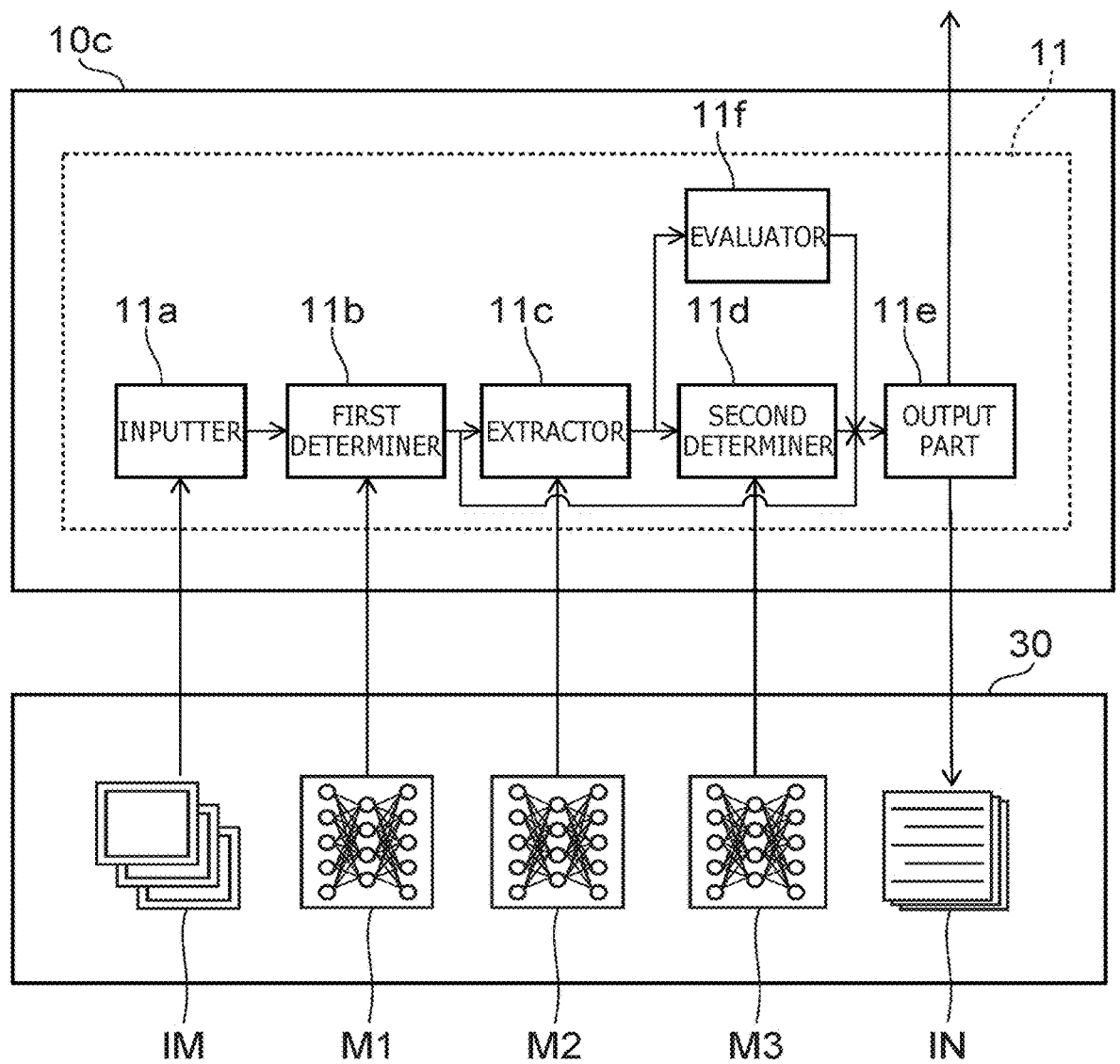
FIG. 17 is a schematic view illustrating the functional configuration of a determination device according to a third modification of the embodiment.

FIG. 17 is a schematic view illustrating the functional configuration of a determination device according to a third modification of the embodiment.

In the determination device 10c according to the second modification, the processor 11 includes an evaluator 11f. The evaluator 11f evaluates the feature output by the extractor 11c.

Specifically, the evaluator 11f corrects the feature when the feature is extracted by the extractor 11c. The correction includes a supplementation of the feature, a deletion of an unnecessary portion, a clarification of the feature, etc. The evaluator 11f compares the extracted feature and the corrected feature. The performance of the second model M2 is evaluated by the evaluator 11f to be higher as the difference between these features decreases.

As an example, the evaluator 11f calculates the difference between an image having an extracted feature (the first feature) and an image having a corrected feature (a second feature). The difference is obtained by comparing the corresponding pixels of the two images to each other and by counting the number of pixels that have changed. The evaluator 11f compares the change count to a preset threshold (a first threshold). When the change count is greater than the threshold, the evaluator 11f determines that a replacement or retraining of the second model M2 is desirable. For example, information that requests the second model M2 to be retrained or replaced is output from the output part 11e to a user.

When the trend of the image acquired by the imager 26 has changed, etc., there is a possibility that the second model M2 can no longer extract the feature appropriately from the image. By evaluating the second model M2 and determining the appropriateness of the weld based on the image, the decrease of the accuracy of the determination can be suppressed.

FIG. 18A, FIG. 18B, FIG. 19A to FIG. 19F, FIG. 20A to FIG. 20C, FIG. 21A to FIG. 21C, FIG. 22A to FIG. 22C, and FIG. 23A to FIG. 23C are images illustrating processing by the determination device according to the third modification of the embodiment.

TIG welding states are shown in FIG. 18A to FIG. 23C.

Figure 18A:
FIG. 18A, FIG. 18B, FIG. 19A to FIG. 19F, FIG. 20A to FIG. 20C, FIG. 21A to FIG. 21C, FIG. 22A to FIG. 22C, and FIG. 23A to FIG. 23C are images illustrating processing by the determination device according to the third modification of the embodiment.

FIG. 18A is an example of an image determined to be appropriate by the first model. The extractor 11c inputs the image illustrated in FIG. 18A to the second model. The features illustrated in FIG. 18B are extracted thereby.

Figure 18B:
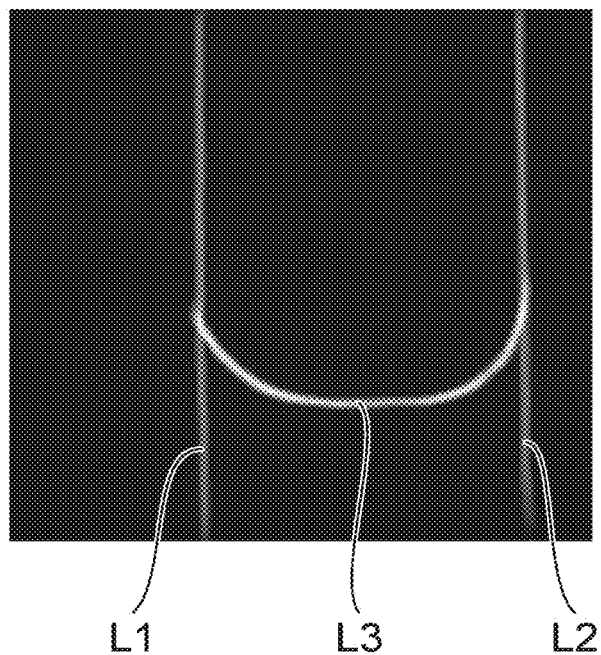

The image illustrated in FIG. 18B includes a line L3 corresponding to the end portion of the weld pool and two lines L1 and L2 corresponding to the wall surfaces of the groove. For example, the lines L1 and L2 are illustrated in red in the image of FIG. 18B. The line L3 is illustrated in green. The other portions are illustrated in blue. The evaluator 11f corrects the image illustrated in FIG. 18B. For example, when correcting, the evaluator 11f deletes or supplements the lines indicating the features and removes the noise included in the image. A specific example of the correction will now be described.

Figure 19A:
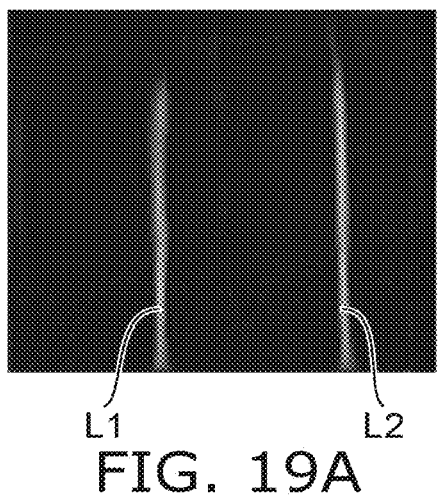
Figure 19D:
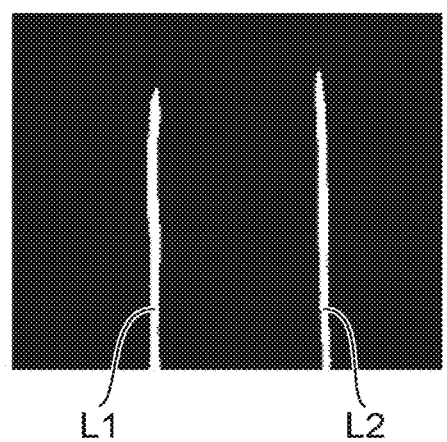
Figure 19B:
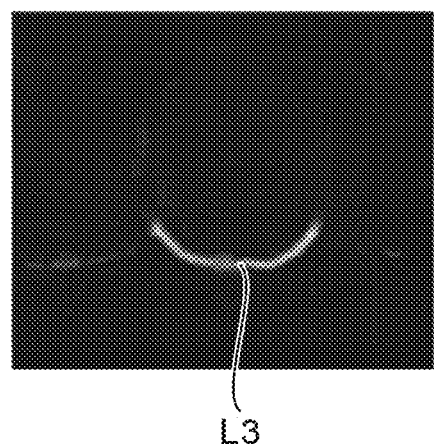
Figure 19E:
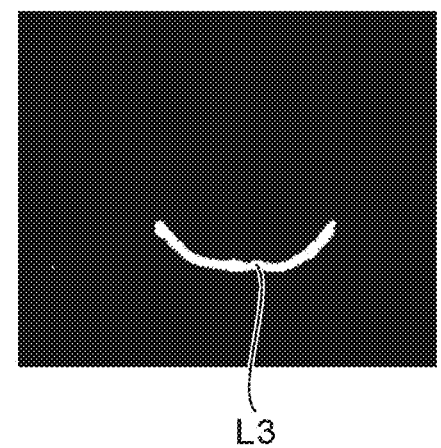
Figure 19C:
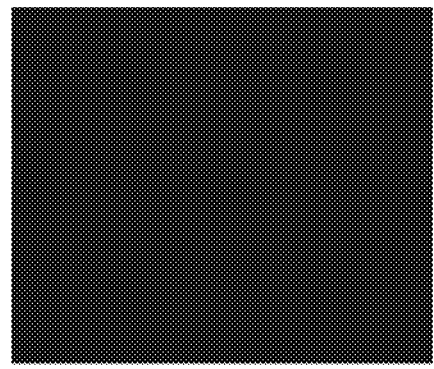

The images of FIG. 19A, FIG. 19B, and FIG. 19C are the image illustrated in FIG. 18B separated into each color. The image of FIG. 19A includes only the lines L1 and L2. The image of FIG. 19B includes only the line L3. The image of FIG. 19C includes only the other components. In the example, substantially nothing is included in the image of FIG. 19C.

Figure 19F:
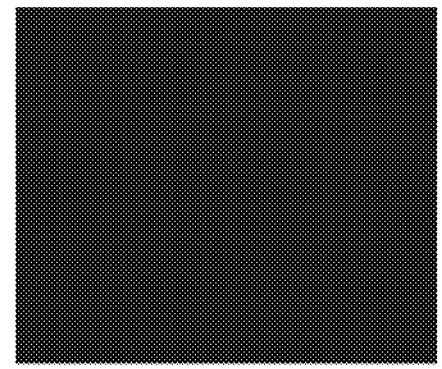

The evaluator 11f binarizes each image. The binarization is performed so that the luminances of the lines L1 to L3 are different from the luminances of the other portions. The evaluator 11f applies at least one of reduction processing or enlargement processing to the binary image. For example, the evaluator 11f applies both reduction processing and enlargement processing to the binary image. The evaluator 11f may perform the enlargement processing and the reduction processing multiple times. The enlargement processing and the reduction processing may be repeated alternately. The execution sequence of the enlargement processing and the reduction processing is modifiable as appropriate. The evaluator 11f may apply rotation processing when performing the reduction processing or the enlargement processing. The images illustrated in FIG. 19D to FIG. 19F are generated thereby. The noise inside the image is removed by the reduction processing and the enlargement processing.

Figure 20A:
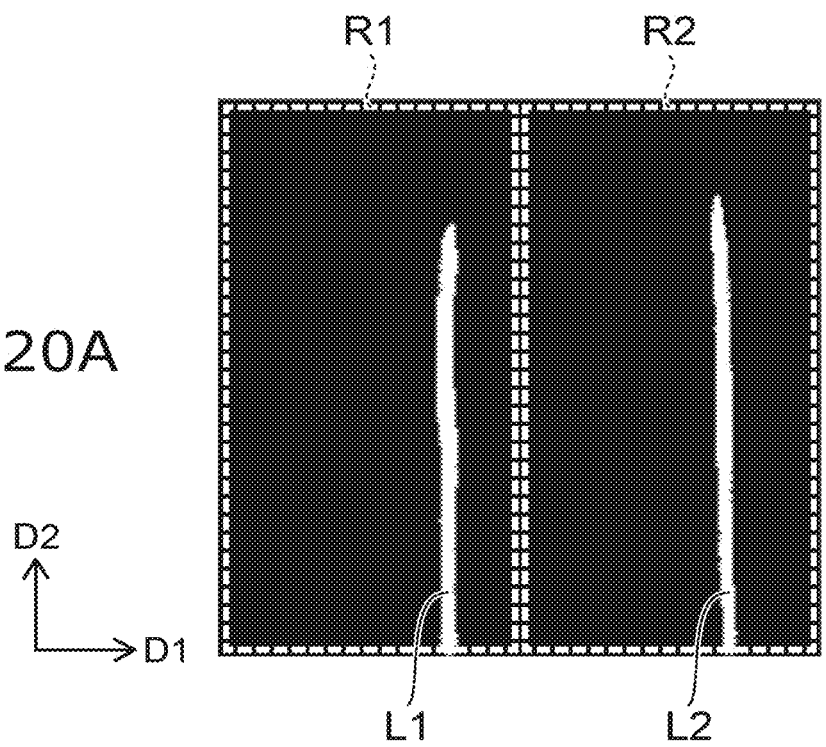

As illustrated in FIG. 20A, the evaluator 11f sets two regions (a region R1 and a region R2) in the image including the lines L1 and L2. The boundary between the region R1 and the region R2 is the center in a first direction D1 of the image. The first direction D1 is a direction connecting the lines L1 and L2. The evaluator 11f calculates the total of the gray values in a second direction D2 at each point in the first direction D1 for the image including the lines L1 and L2. The second direction D2 is a direction perpendicular to the first direction D1.

Figure 20B:
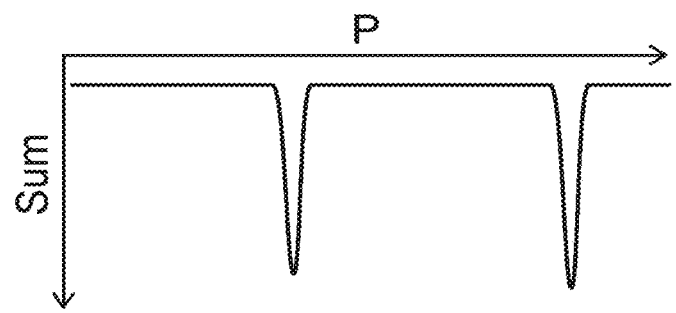

FIG. 20B illustrates the calculation results of the total of the gray values. In FIG. 20B, the horizontal axis is a position P in the first direction D1. The vertical axis is a total Sum of the gray values. The evaluator 11f detects the peaks of the total Sum respectively in the regions R1 and R2. If multiple peaks are detected in the region R1 or R2, only the peak most proximal to the center in the first direction D1 of the image remains, and the other peaks are removed. Thereby, an image is obtained in which only one line exists in each of the regions R1 and R2.

For example, there is a possibility that another line along the one direction other than the lines L1 and L2 may exist in the image output from the model. Lines that are distal to the center are removed by the processing recited above. In the example of FIG. 20A and FIG. 20B, only one peak is detected in each of the regions R1 and R2. Therefore, in the example of FIG. 20A and FIG. 20B, the deletion of peaks is not performed. Then, the evaluator 11f performs a straight-line approximation of the lines L1 and L2. The image illustrated in FIG. 20A to the image illustrated in FIG. 20C are obtained thereby.

Figure 21A:
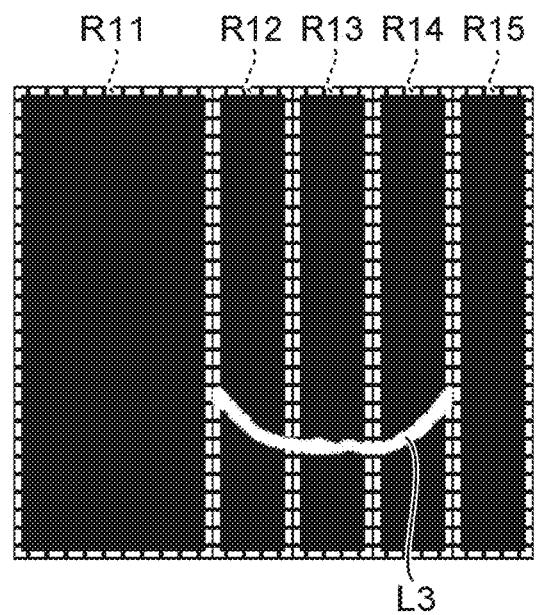

Based on the position information of the lines L1 and L2, the evaluator 11f sets five regions R11 to R15 as illustrated in FIG. 21A for the image illustrated in FIG. 19E. The position of the boundary between the regions R11 and R12 corresponds to the position of the line L1. The position of the boundary between the regions R14 and R15 corresponds to the position of the line L2. The regions R12 to R14 are set by uniformly trisecting the region between the boundary corresponding to the line L1 and the boundary corresponding to the line L2.

When portions of the line L3 exist in the regions R11 and R15, the evaluator 11f removes such portions. In other words, the evaluator 11f sets all of the luminances of the pixels included in the regions R11 and R15 to a value corresponding to black. The evaluator 11f performs a curve approximation of a portion of the line L3 existing in the regions R12 and R14. The evaluator 11*f* does not apply processing to the portion of the line L3 existing in the region R13. This processing generates the image illustrated in FIG. 21B.

Figure 20C:
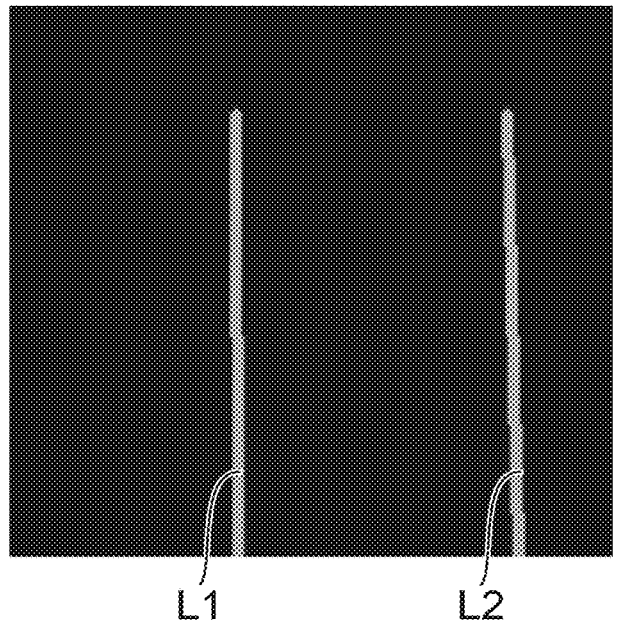
Figure 21B:
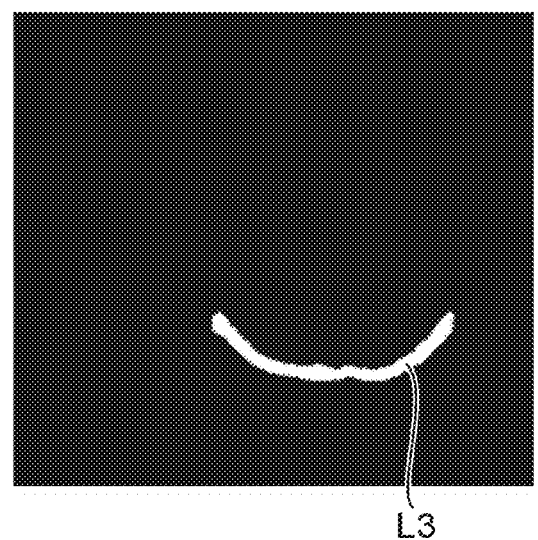
Figure 21C:
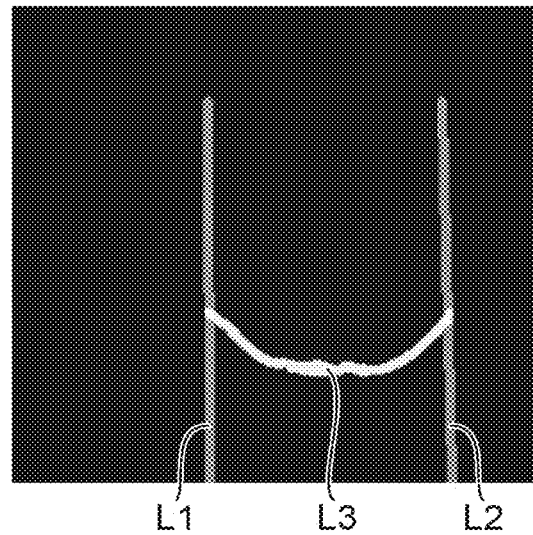

The evaluator 11*f* generates the image illustrated in FIG. 21C by merging the image illustrated in FIG. 19F, the image illustrated in FIG. 20C, and the image illustrated in FIG. 21B. The lines L1 to L3 are unclear in the image illustrated in FIG. 18B but have become clear lines due to the correction. The evaluator 11*f* compares the image illustrated in FIG. 18B and the image illustrated in FIG. 21C and counts the change count of the pixels. The evaluator 11*f* evaluates the performance of the second model based on the change count.

FIG. 22A to FIG. 22C and FIG. 23A to FIG. 23C illustrate another example.

Figure 22A:
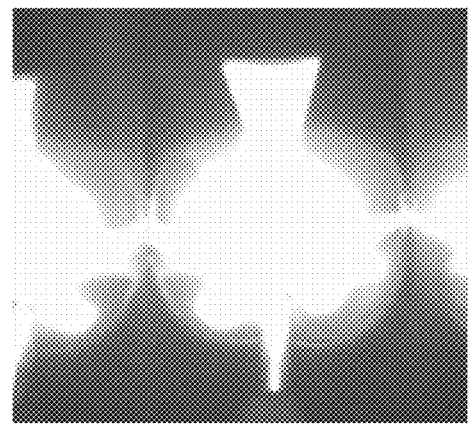
Figure 22B:
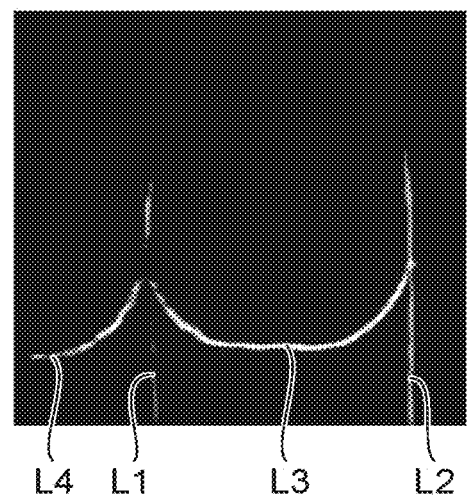

The evaluator 11*f* acquires the image of FIG. 22B by inputting the image of FIG. 22A to the second model. The line L1 is unclear in the image of FIG. 22B. A line L4 is included in the image of FIG. 22B in addition to the lines L1 to L3. By the correction, the line L1 becomes clear, and the line L4 is removed. The evaluator 11*f* corrects the image of FIG. 22B by applying processing similar to that recited above and generates the image of FIG. 22C.

Figure 22C:
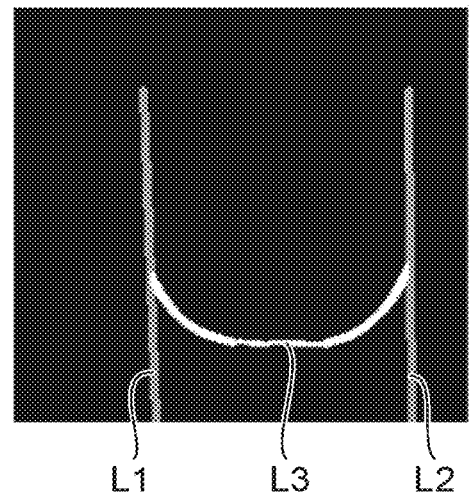

The evaluator 11*f* compares the image illustrated in FIG. 22B and the image illustrated in FIG. 22C and counts the change count of the pixels. The evaluator 11*f* evaluates the performance of the second model based on the change count.

Figure 23A:
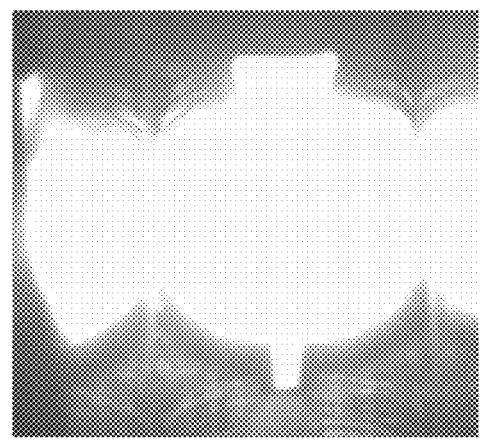
Figure 23B:
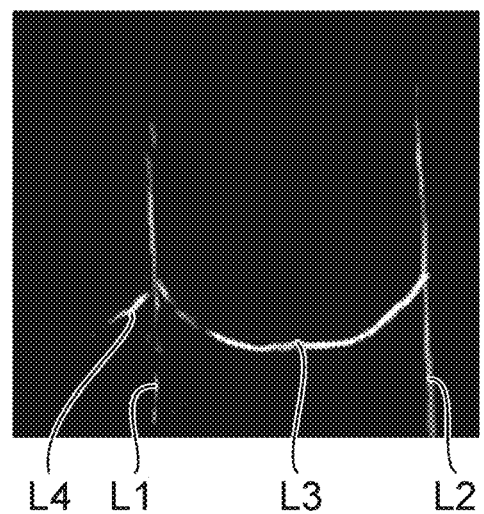
Figure 23C:
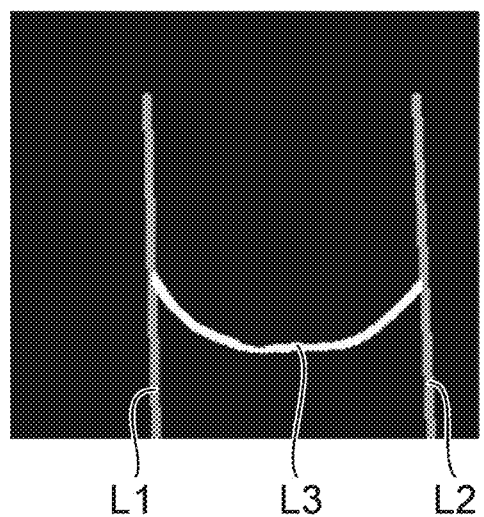

Similarly, the evaluator 11*f* acquires the image of FIG. 23B by inputting the image of FIG. 23A to the second model. The evaluator 11*f* corrects the image of FIG. 23B and generates the image of FIG. 23C. The evaluator 11*f* compares the image illustrated in FIG. 23B and the image illustrated in FIG. 23C and counts the change count of the pixels. The evaluator 11*f* evaluates the performance of the second model based on the change count.

Figure 24:
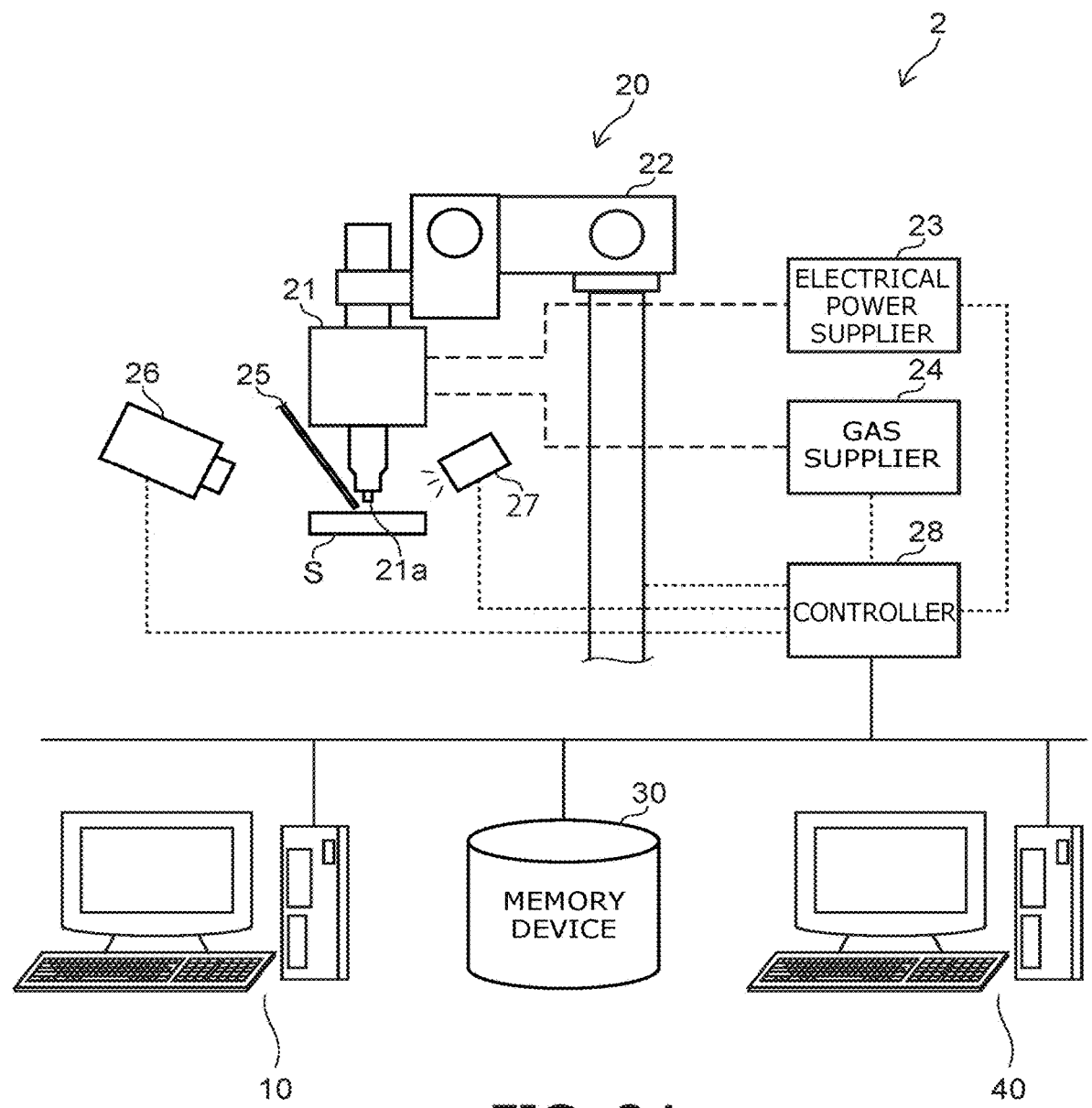
FIG. 24 is a schematic view illustrating another welding system including the determination device according to the embodiment.

FIG. 24 is a schematic view illustrating another welding system including the determination device according to the embodiment.

The welding system 2 illustrated in FIG. 24 includes a determination system including the determination device 10 and a training device 40. The training device 40 trains the models used by the determination device 10. The training device 40 stores the trained models in the memory device 30.

As described above, supervised learning of the models is performed using teaching data. The training device 40 may perform semi-supervised learning. For example, semi-supervised learning is used when training the second model M2.

For example, the training device 40 performs supervised learning of the second model M2 by using multiple input images and multiple teacher images showing the features (a first operation). Subsequently, the training device 40 inputs another input image to the second model M2 and obtains an image output from the second model M2. The training device 40 corrects the output image and obtains an appropriate image showing the features relating to the weld. As described above, the correction includes a supplementation of the feature, a deletion of an unnecessary portion, a clarification of the feature, etc. The training device 40 also performs supervised learning of the second model M2 by using the other input image and the corrected image (a second operation).

Or, the training device 40 performs supervised learning of the second model M2 by using multiple input images and multiple teacher images (the first operation). For example, the input image is compared to a desirable image and rotated, enlarged, or reduced. Or, the input image includes a scratch, a defect, etc. The teacher image is an image in which the defect, the scratch, or the like is corrected. Subsequently, the training device 40 inputs another input image to the second model M2 and obtains an image output from the second model M2. The training device 40 corrects the output image to a more desirable state. The training device 40 also performs supervised learning of the second model M2 by using the other input image and the corrected image (the second operation). The data amount that is necessary for the training can be reduced by generating a teacher image based on the image output from the model when training the model.

The training device 40 may include a function of generating an input image used to train the second model M2. For example, the training device 40 generates an input image by applying processing such as a rotation, an enlargement, a reduction, a contrast modification, an addition of a defect, an addition of a scratch, an addition of a bead mark, a modification of a bead width, etc., to the teacher image used in the training. The training device 40 trains the second model M2 by using the teacher image and the generated input image.

The data amount that is necessary for training can be reduced by generating the input image from the teacher image when training the model.

Figure 25:
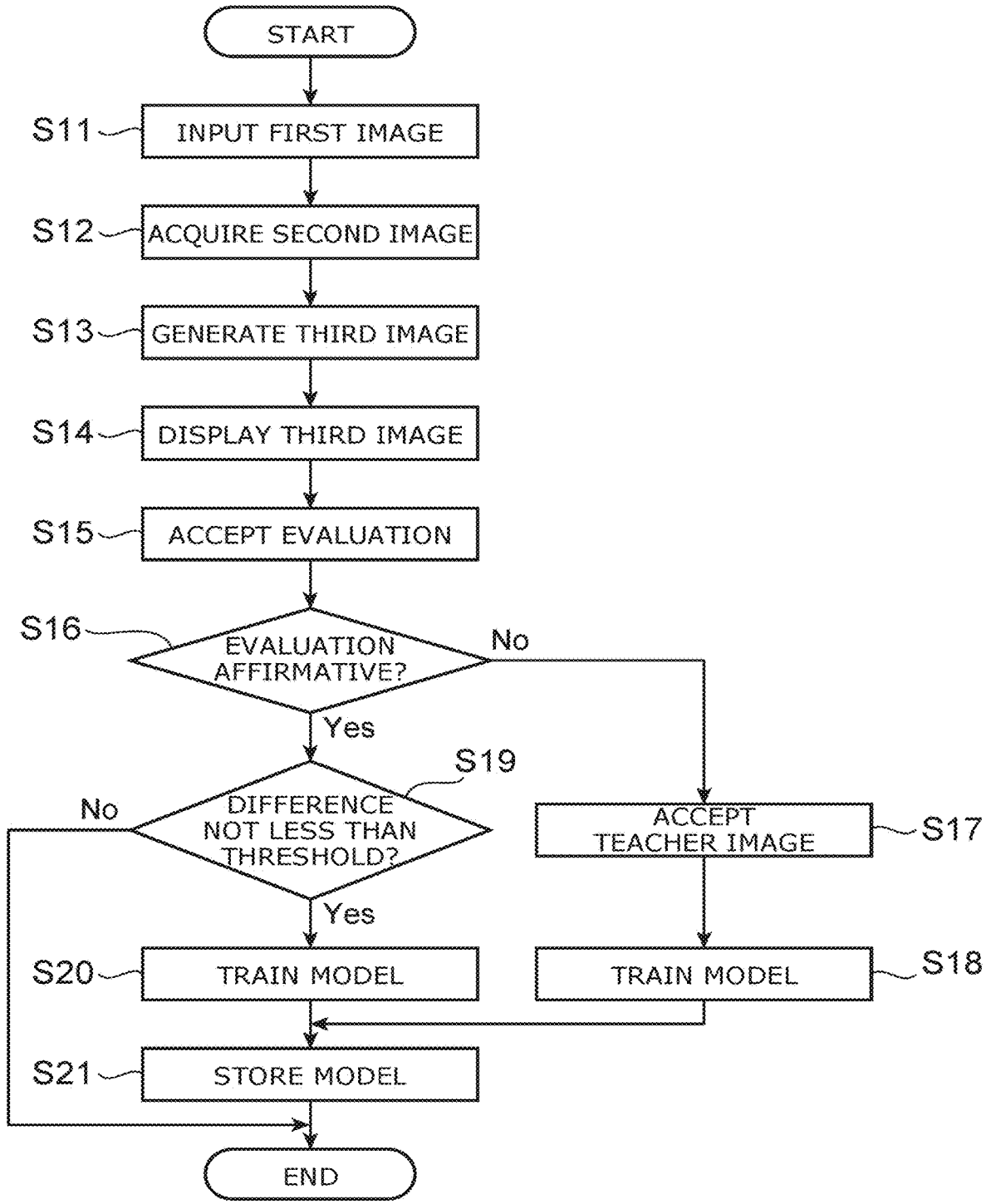
FIG. 25 is a flowchart illustrating the operation of the training device.

FIG. 25 is a flowchart illustrating the operation of the training device.

FIG. 25 illustrates the operation of the semi-supervised learning by the training device. FIG. 25 also shows an example in which the training device 40 receives an evaluation of the image used in the training from the user when performing the semi-supervised learning.

The training device 40 accesses the memory device 30 and inputs a first image (an input image) to the trained model (step S11). The training device 40 acquires a second image (an output image) output from the model (step S2). The training device 40 corrects the second image and generates a third image (a corrected image) that is different from the second image (step S3).

The training device 40 causes the display device to display the third image (step S14). The user confirms the third image and provides an input relating to the evaluation of the third image by using the input device. The training device 40 accepts the evaluation from the user (step S15). The display device is, for example, a monitor or a projector. The input device is, for example, a keyboard, a mouse, a touchpad, or a microphone (an audio input). A device such as a touch panel that includes functions of both a display device and an input device may be used.

The training device 40 determines whether or not the evaluation is affirmative (step S16). When the evaluation is negative, the training device 40 requests the user to input a teacher image. The training device 40 accepts the teacher image (a fourth image) input from the user (step S17). The training device 40 trains the model by using the first image as input data and the fourth image as teacher data (step S18).

When the evaluation is affirmative, the training device 40 calculates the difference between the second image and the third image. The training device 40 determines whether or not the difference exceeds a prescribed threshold (step S19). When the difference exceeds the threshold, the training device 40 trains the model by using the first image as input data and the third image as teacher data (step S20). After step S18 or S20, the training device 40 stores the trained model (step S21). The training device 40 ends the processing when the difference is not more than the threshold.

According to the operation illustrated in FIG. 25, only appropriate third images are used as teacher data to train the model. Also, the fourth image that is input by the user is used to train the model when the third image is inappropriate. Therefore, the model can be trained appropriately so that the results intended by the user are output.

In the operation illustrated in FIG. 25, the training device 40 may perform step S20 regardless of the difference between the second image and the third image when the evaluation of the third image is affirmative. However, a small difference indicates that the image output from the model is sufficiently desirable. Accordingly, there is little need to perform the training using the third image. By determining whether or not to perform the training based on the difference, useless training of the model can be suppressed. The calculation amount of the training device 40 can be reduced thereby. Also, overtraining of the model and a decrease of the generalization of the model can be suppressed.

Figure 26:
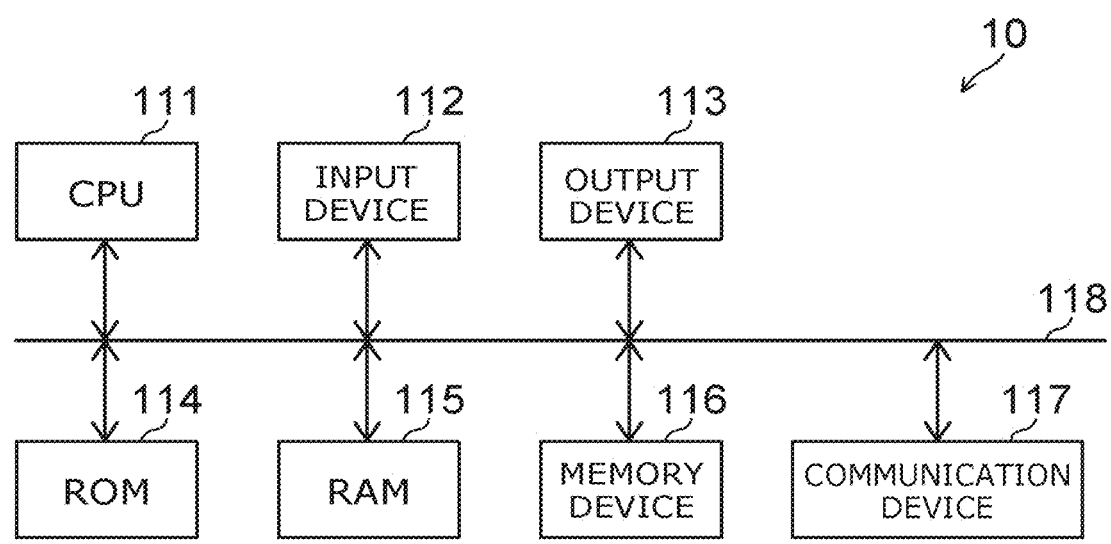
FIG. 26 is a schematic view illustrating the hardware configuration of the determination device according to the embodiment.

FIG. 26 is a schematic view illustrating the hardware configuration of the determination device according to the embodiment.

The determination devices described above include a central processing unit (CPU) 111, an input device 112, an output device 113, ROM (Read Only Memory) 114, RAM (Random Access Memory) 115, a memory device 116, a communication device 117, and a bus 118. The components are connected by the bus 118.

The CPU 111 includes a processing circuit. The CPU 111 performs various processes in cooperation with various programs prestored in the ROM 114 or the memory device 116 and comprehensively controls the operation of the determination device 10. The function as the processor 11 of the determination devices described above is realized thereby. In the processing, the CPU 111 uses a prescribed region of the RAM 115 as a work region. The CPU 111 realizes the input device 112, the output device 113, the communication device 117, etc., in cooperation with programs prestored in the ROM 114 or the memory device 116.

The input device 112 includes, for example, a keyboard, a mouse, or a touch panel. The input device 112 accepts information input from the user as instruction signals and outputs the instruction signals to the CPU 111. The output device 113 is, for example, a monitor. The output device 113 visibly outputs various information based on signals output from the CPU 111.

The ROM 114 non-rewritably stores programs used to control the determination device 10, various setting information, etc. The RAM 115 is a volatile storage medium such as SDRAM (Synchronous Dynamic Random Access Memory), etc. The RAM 115 functions as a work region of the CPU 111. Specifically, the RAM 115 functions as a buffer temporarily storing various variables, parameters, etc., used by the determination device 10, etc.

The memory device 116 is a rewritable recording device such as a semiconductor storage medium such as flash memory or the like, a magnetically or optically recordable storage medium, etc. The memory device 116 stores programs used to control the determination device 10, various setting information, etc. The communication device 117 is used to transmit and receive information by communicating with external devices.

A hardware configuration of the determination device is described herein. Similar configurations are applicable to the hardware configuration of the training device as well. Or, one of the hardware shown in FIG. 26 may function as both the determination device and the training device.

According to embodiments described above, a determination device, a determination system, a welding system, and a determination method can be provided in which the quality of the weld can be determined with higher accuracy. A welding device that performs better welding can be provided by performing welding based on the determination results of the determination device, the determination system, the welding system, and the determination method. Also, the determination for the weld can be performed with higher accuracy by using a program for performing the embodiments described above in a processor (a processing circuit) and by using a storage medium storing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A determination system, comprising:
   a determination device comprising a processor,
   the processor inputting a first image to a first model when the first image is input to the processor, the first image being of a welding spot when welding, the first model being for determining whether or not an image is appropriate,
   the processor determining an appropriateness of a weld by using the first image when the first image is determined to be appropriate by the first model, and outputting information for correcting an imaging condition of the welding spot when the first image is determined to be inappropriate by the first model, wherein
   when the first image is determined to be appropriate by the first model, the processor inputs the first image to a second model and determines the appropriateness of the weld by using a first feature extracted by the second model, the second model being for extracting a feature relating to a weld from an image; and
   further comprising;
   a training device training the second model,
   the training device performing at least
      a first operation of training the second model by using a plurality of input images and a plurality of teacher images, and
      a second operation of training the second model by using an other input image and a corrected image, the corrected image being obtained by inputting the other input image to the second model and correcting an output image output from the second model.

2. The system according to claim 1, wherein the processor evaluates a performance of the second model by using a difference between the first feature and a second feature, the second feature being obtained by correcting the first feature.

3. The system according to claim 2, wherein the processor outputs information requesting a replacement or retraining of the second model when the difference is greater than a first threshold, the first threshold being preset.

4. The system according to claim 1, wherein the processor determines the appropriateness of the weld imaged in the first image by inputting the first feature to a third model, the third model being for determining an appropriateness of a weld from a feature relating to the weld.

5. The system according to claim 4, wherein the third model also outputs a correction amount of a welding condition when the weld is determined to be inappropriate.

6. The system according to claim 1, wherein the second model is configured to correct an image and output a feature of the corrected image.

7. The system according to claim 6, wherein the correcting includes a rotation, an enlargement, a reduction, or a contrast adjustment of the image.

8. The system according to claim 6, wherein the correcting includes removing a detect, a scratch, or a bead mark.

9. The system according to claim 6, wherein the correcting includes an enlargement or a reduction of a bead width.

10. A welding system, comprising:
   the determination system according to claim 1; and
   a welding device including an imager acquiring the first image.

* * * * *